United States Patent
Bai et al.

(10) Patent No.: US 12,543,081 B2
(45) Date of Patent: Feb. 3, 2026

(54) TECHNIQUES FOR CONFIGURING AN INITIAL UPLINK TRANSMISSION AFTER A CELL SWITCH

(71) Applicant: QUALCOMM Incorporated, San Diego, CA (US)

(72) Inventors: Tianyang Bai, Somerville, NJ (US); Yan Zhou, San Diego, CA (US); Naeem Akl, Bridgewater, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 18/191,162

(22) Filed: Mar. 28, 2023

(65) Prior Publication Data

US 2024/0334267 A1  Oct. 3, 2024

(51) Int. Cl.
*H04W 36/00* (2009.01)
*H04W 72/1268* (2023.01)

(52) U.S. Cl.
CPC .  *H04W 36/0072* (2013.01); *H04W 36/00837* (2018.08); *H04W 72/1268* (2013.01)

(58) Field of Classification Search
CPC ....... H04W 36/0072; H04W 36/00837; H04W 72/1268
See application file for complete search history.

(56) References Cited

U.S. PATENT DOCUMENTS

| | | | |
|---|---|---|---|
| 2010/0003981 A1* | 1/2010 | Ahluwalia | H04W 36/08 455/436 |
| 2017/0135000 A1* | 5/2017 | Cai | H04W 76/19 |
| 2017/0142620 A1* | 5/2017 | Rune | H04W 36/38 |
| 2018/0359735 A1* | 12/2018 | Lee | H04W 72/23 |
| 2021/0051548 A1* | 2/2021 | Ozturk | H04W 36/0072 |
| 2021/0204309 A1* | 7/2021 | Babaei | H04L 5/0053 |
| 2021/0211947 A1* | 7/2021 | Agiwal | H04W 72/23 |

(Continued)

FOREIGN PATENT DOCUMENTS

| | | |
|---|---|---|
| WO | 2016003342 A1 | 1/2016 |
| WO | 2017196459 A1 | 11/2017 |

OTHER PUBLICATIONS

International Search Report and Written Opinion—PCT/US2024/020875—ISA/EPO—Sep. 16, 2024.

(Continued)

*Primary Examiner* — Kenny S Lin
(74) *Attorney, Agent, or Firm* — Paul M. McAdams; Holland & Hart LLP

(57) ABSTRACT

Methods, systems, and devices for wireless communication are described. A first network node may receive information via a first cell. The information may indicate a resource allocation for transmission of an initial uplink message via a second cell. The initial uplink message is a first uplink transmission scheduled to occur between the first network node and a second network node after a handover of the first network node from the first cell to the second cell. The first network node may receive a command via the first cell. The command may trigger the handover of the first network node from the first cell to the second cell. In response to the command message, the first network node may transmit the initial uplink message via the second cell.

30 Claims, 16 Drawing Sheets

(56) References Cited

U.S. PATENT DOCUMENTS

| | | | |
|---|---|---|---|
| 2022/0141739 A1* | 5/2022 | Fan | H04W 74/0833 |
| | | | 370/331 |
| 2022/0210800 A1* | 6/2022 | Babaei | H04L 5/0092 |
| 2022/0225472 A1* | 7/2022 | Kim | H04W 36/0033 |
| 2023/0199571 A1* | 6/2023 | Babaei | H04W 36/0072 |
| | | | 370/331 |
| 2023/0224997 A1* | 7/2023 | Agiwal | H04W 56/0045 |
| 2023/0262818 A1* | 8/2023 | Kim | H04W 76/19 |
| | | | 370/328 |

OTHER PUBLICATIONS

Partial International Search Report—PCT/US2024/020875—ISA/EPO—Jun. 28, 2024.

* cited by examiner

TECHNIQUES FOR CONFIGURING AN INITIAL UPLINK TRANSMISSION AFTER A CELL SWITCH

The following relates to wireless communication, including techniques for configuring an initial uplink transmission after a cell switch.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE).

SUMMARY

The described techniques relate to improved methods, systems, devices, and apparatuses that support techniques for configuring an initial uplink transmission after a cell switch. For example, the described techniques provide a framework for scheduling resources for transmission of initial uplink messages after handover events. In some examples, a first network node may receive information via a first cell. The information may indicate a resource allocation for transmission of an initial uplink message via a second cell in which the initial uplink message is a first uplink transmission scheduled to occur between the first network node and a second network node after a handover event in which communications at the first network node switch from the first cell to the second cell. Additionally, the first network node may receive a command via the first cell. The command may trigger the handover of the first network node from the first cell to the second cell. In response to the command message, the first network node may transmit the initial uplink message via the second cell.

A method of wireless communication performed by a first network node is described. The method may include receiving, via a first cell, information that indicates a resource allocation for transmission, via a second cell, of an initial uplink message, where the initial uplink message is a first uplink transmission scheduled to occur between the first network node and a second network node after a handover of the first network node from the first cell to the second cell, receiving, via the first cell, a command that triggers the handover of the first network node from the first cell to the second cell, and transmitting, via the second cell, the initial uplink message in response to the command and in accordance with the resource allocation.

A first network node for wireless communication is described. The first network node may include a memory and at least one processor coupled to the memory. The at least one processor may be configured to receive, via a first cell, information that indicates a resource allocation for transmission, via a second cell, of an initial uplink message, where the initial uplink message is a first uplink transmission scheduled to occur between the first network node and a second network node after a handover of the first network node from the first cell to the second cell, receive, via the first cell, a command that triggers the handover of the first network node from the first cell to the second cell, and transmit, via the second cell, the initial uplink message in response to the command and in accordance with the resource allocation.

An apparatus for wireless communication is described. The apparatus may include means for receiving, via a first cell, information that indicates a resource allocation for transmission, via a second cell, of an initial uplink message, where the initial uplink message is a first uplink transmission scheduled to occur between the first network node and a second network node after a handover of the first network node from the first cell to the second cell, means for receiving, via the first cell, a command that triggers the handover of the first network node from the first cell to the second cell, and means for transmitting, via the second cell, the initial uplink message in response to the command and in accordance with the resource allocation.

A non-transitory computer-readable medium having code for wireless communication stored thereon is described. The code, when executed by a first network node, may cause the first network node to receive, via a first cell, information that indicates a resource allocation for transmission, via a second cell, of an initial uplink message, where the initial uplink message is a first uplink transmission scheduled to occur between the first network node and a second network node after a handover of the first network node from the first cell to the second cell, receive, via the first cell, a command that triggers the handover of the first network node from the first cell to the second cell, and transmit, via the second cell, the initial uplink message in response to the command and in accordance with the resource allocation.

In some examples of the method, first network node, apparatus, and non-transitory computer-readable medium described herein, receiving the information may include operations, features, means, or instructions for receiving a cell switch command message that includes both the information and the command.

In some examples of the method, first network node, apparatus, and non-transitory computer-readable medium described herein, the initial uplink message may be one of a physical uplink shared channel (PUSCH) transmission, a sounding reference signal (SRS), a physical uplink control channel (PUCCH) transmission, or a physical random access channel (PRACH) transmission.

In some examples of the method, first network node, apparatus, and non-transitory computer-readable medium described herein, receiving the information may include operations, features, means, or instructions for receiving, via the first cell, a control message that indicates one or more resource allocations for transmission of initial uplink messages after cell handovers, where the one or more resource allocations includes at least the resource allocation.

In some examples of the method, first network node, apparatus, and non-transitory computer-readable medium described herein, receiving the command may include operations, features, means, or instructions for receiving a cell switch command message that includes the command and an indication to activate the resource allocation for transmission of the initial uplink message after the handover.

In some examples of the method, first network node, apparatus, and non-transitory computer-readable medium described herein, the resource allocation includes a respective set of periodic or semi-persistent resources.

In some examples of the method, first network node, apparatus, and non-transitory computer-readable medium described herein, the initial uplink message may be one of a configured grant PUSCH transmission, a scheduling request (SR), a periodic or semi-persistent SRS, or a PRACH transmission.

In some examples of the method, first network node, apparatus, and non-transitory computer-readable medium described herein, receiving the command may include operations, features, means, or instructions for receiving a cell switch command message that includes the command, where reception of the cell switch command message activates the resource allocation for transmission of the initial uplink message.

In some examples of the method, first network node, apparatus, and non-transitory computer-readable medium described herein, transmitting the initial uplink message may include operations, features, means, or instructions for transmitting the initial uplink message after a timing offset, where reception of the cell switch command message triggers the timing offset, and where a duration of the timing offset may be preconfigured or may be indicated in the cell switch command message.

In some examples of the method, first network node, apparatus, and non-transitory computer-readable medium described herein, the first cell may be associated with a first distributed unit (DU) and the second cell may be associated with the first DU or a second DU different from the first DU.

In some examples of the method, first network node, apparatus, and non-transitory computer-readable medium described herein, the initial uplink message includes identity information that identifies the first network node.

In some examples of the method, first network node, apparatus, and non-transitory computer-readable medium described herein, transmitting the initial uplink message may include operations, features, means, or instructions for transmitting a PUSCH transmission as the initial uplink message, where the identity information may be a cell radio network temporary identifier (C-RNTI) included in the PUSCH transmission.

In some examples of the method, first network node, apparatus, and non-transitory computer-readable medium described herein, transmitting the initial uplink message may include operations, features, means, or instructions for transmitting a PUSCH transmission as the initial uplink message, where the identity information may be associated with a resource used for the PUSCH transmission.

In some examples of the method, first network node, apparatus, and non-transitory computer-readable medium described herein, transmitting the initial uplink message may include operations, features, means, or instructions for transmitting a PUCCH transmission or a SRS as the initial uplink message, where the identity information may be indicated by a sequence or scrambling identifier associated with the PUCCH transmission or the SRS.

In some examples of the method, first network node, apparatus, and non-transitory computer-readable medium described herein, transmitting the initial uplink message may include operations, features, means, or instructions for transmitting a PRACH transmission as the initial uplink message, where the identity information may be a dedicated preamble associated with the PRACH transmission.

Some examples of the method, first network node, apparatus, and non-transitory computer-readable medium described herein may further include operations, features, means, or instructions for receiving, via the second cell, a response message responsive to the initial uplink message.

In some examples of the method, first network node, apparatus, and non-transitory computer-readable medium described herein, the response message includes a random access response message when the initial uplink message may be a PRACH transmission.

In some examples of the method, first network node, apparatus, and non-transitory computer-readable medium described herein, the response message includes a physical downlink control channel (PDCCH) transmission that includes a cyclic redundancy check (CRC) that may be scrambled with an identifier of the first network node.

In some examples of the method, first network node, apparatus, and non-transitory computer-readable medium described herein, the identifier may be a C-RNTI associated with the second cell.

Some examples of the method, first network node, apparatus, and non-transitory computer-readable medium described herein may further include operations, features, means, or instructions for receiving, via the first cell, an indication of a control resource set (CORESET) associated with the second cell and monitoring the CORESET for the response message after transmission of the initial uplink message, where the CORESET may be monitored in accordance with a transmission configuration indicator state associated with the second cell.

Some examples of the method, first network node, apparatus, and non-transitory computer-readable medium described herein may further include operations, features, means, or instructions for determining, via the first cell, one or more parameters associated with the second cell, where transmission of the initial uplink message may be in accordance with at least one parameter of the one or more parameters.

In some examples of the method, first network node, apparatus, and non-transitory computer-readable medium described herein, determining the one or more parameters may include operations, features, means, or instructions for receiving a cell switch command message that includes the command and an indication of the one or more parameters.

In some examples of the method, first network node, apparatus, and non-transitory computer-readable medium described herein, determining the one or more parameters may include operations, features, means, or instructions for determining the one or more parameters via a rule or from one or more preconfigured values.

In some examples of the method, first network node, apparatus, and non-transitory computer-readable medium described herein, the one or more parameters include one or more transmission configuration indicator states, one or more timing advance values, or one or more power control parameters.

A method of wireless communication performed by a first network node is described. The method may include outputting, via a first cell, information that indicates a resource allocation for transmission, via a second cell, of an initial uplink message by a second network node, where the initial uplink message is a first uplink transmission scheduled to occur between the second network node and a third network node after a handover of the second network node from the first cell to the second cell and outputting, via the first cell, a command that triggers the handover of the second network node from the first cell to the second cell.

A first network node for wireless communication is described. The first network node may include a memory and at least one processor coupled to the memory. The at least one processor may be configured to output, via a first cell, information that indicate a resource allocation for transmission, via a second cell, of an initial uplink message by a second network node, where the initial uplink message is a first uplink transmission scheduled to occur between the second network node and a third network node after a handover of the second network node from the first cell to the second cell and outputting, via the first cell, a command that trigger the handover of the second network node from the first cell to the second cell.

An apparatus for wireless communication at a first network node is described. The apparatus may include means for outputting, via a first cell, information that indicates a resource allocation for transmission, via a second cell, of an initial uplink message by a second network node, where the initial uplink message is a first uplink transmission scheduled to occur between the second network node and a third network node after a handover of the second network node from the first cell to the second cell and means for outputting, via the first cell, a command that triggers the handover of the second network node from the first cell to the second cell.

A non-transitory computer-readable medium having code for wireless communication stored thereon is described. The code, when executed by a first network node, may cause the first network node to output, via a first cell, information that indicate a resource allocation for transmission, via a second cell, of an initial uplink message by a second network node, where the initial uplink message is a first uplink transmission scheduled to occur between the second network node and a third network node after a handover of the second network node from the first cell to the second cell and outputting, via the first cell, a command that trigger the handover of the second network node from the first cell to the second cell.

In some examples of the method, first network node, apparatus, and non-transitory computer-readable medium described herein, outputting the information may include operations, features, means, or instructions for outputting a cell switch command message that includes both the information and the command.

In some examples of the method, first network node, apparatus, and non-transitory computer-readable medium described herein, the initial uplink message may be one of a PUSCH transmission, a SRS, a PUCCH transmission, or a PRACH transmission.

In some examples of the method, first network node, apparatus, and non-transitory computer-readable medium described herein, outputting the information may include operations, features, means, or instructions for outputting, via the first cell, a control message that indicates one or more resource allocations for transmission of initial uplink messages after cell handovers, where the one or more resource allocations includes at least the resource allocation.

In some examples of the method, first network node, apparatus, and non-transitory computer-readable medium described herein, outputting the command may include operations, features, means, or instructions for outputting a cell switch command message that includes the command and an indication to activate the resource allocation for transmission of the initial uplink message after the handover.

In some examples of the method, first network node, apparatus, and non-transitory computer-readable medium described herein, the resource allocation includes a respective set of periodic or semi-persistent resources.

In some examples of the method, first network node, apparatus, and non-transitory computer-readable medium described herein, the initial uplink message may be one of a configured grant PUSCH transmission, a SR, a periodic or semi-persistent SRS, or a PRACH transmission.

In some examples of the method, first network node, apparatus, and non-transitory computer-readable medium described herein, outputting the command may include operations, features, means, or instructions for outputting a cell switch command message that includes the command, where reception of the cell switch command message activates the resource allocation for transmission of the initial uplink message.

In some examples of the method, first network node, apparatus, and non-transitory computer-readable medium described herein, the first cell may be associated with a first DU and the second cell may be associated with the first DU or a second DU different from the first DU.

In some examples of the method, first network node, apparatus, and non-transitory computer-readable medium described herein, the second cell may be associated with the second DU and the resource allocation may be determined at the second DU.

Some examples of the method, first network node, apparatus, and non-transitory computer-readable medium described herein may further include operations, features, means, or instructions for outputting a cell switch command message that includes the command and an indication of one or more parameters associated with the second cell.

In some examples of the method, first network node, apparatus, and non-transitory computer-readable medium described herein, the one or more parameters include one or more transmission configuration indicator states, one or more timing advance values, or one or more power control parameters.

A method of wireless communication performed by a first network node is described. The method may include obtaining an initial uplink message via a first cell and from a second network node, where the initial uplink message is a first uplink transmission scheduled to occur between the second network node and the first network node after a handover of the second network node from a second cell to the first cell, where the initial uplink message is different from a random access message and includes identity information that identifies the second network node and outputting, via the first cell, a response message that is associated with the second network node via the identity information.

A first network node for wireless communication is described. The first network node may include a memory and at least one processor coupled to the memory. The at least one processor may be configured to obtain an initial uplink message via a first cell and from a second network node, where the initial uplink message is a first uplink transmission scheduled to occur between the second network node and the first network node after a handover of the second network node from a second cell to the first cell, where the initial uplink message is different from a random access message and includes identity information that identifies the second network node and outputting, via the first cell, a response message that be associated with the second network node via the identity information.

An apparatus for wireless communication at a first network node is described. The apparatus may include means for obtaining an initial uplink message via a first cell and from a second network node, where the initial uplink message is a first uplink transmission scheduled to occur between the second network node and the first network node after a handover of the second network node from a second cell to the first cell, where the initial uplink message is different from a random access message and includes identity information that identifies the second network node and means for outputting, via the first cell, a response message that is associated with the second network node via the identity information.

A non-transitory computer-readable medium having code for wireless communication stored thereon is described. The code, when executed by a first network node, may cause the first network node to obtain an initial uplink message via a first cell and from a second network node, where the initial uplink message is a first uplink transmission scheduled to occur between the second network node and the first network node after a handover of the second network node from a second cell to the first cell, where the initial uplink message is different from a random access message and includes identity information that identifies the second network node and outputting, via the first cell, a response message that be associated with the second network node via the identity information.

In some examples of the method, first network node, apparatus, and non-transitory computer-readable medium described herein, obtaining the initial uplink message may include operations, features, means, or instructions for obtaining the initial uplink message after a timing offset.

In some examples of the method, first network node, apparatus, and non-transitory computer-readable medium described herein, obtaining the initial uplink message may include operations, features, means, or instructions for obtaining a PUSCH transmission as the initial uplink message, where the identity information may be a C-RNTI included in the PUSCH transmission.

In some examples of the method, first network node, apparatus, and non-transitory computer-readable medium described herein, obtaining the initial uplink message may include operations, features, means, or instructions for obtaining a PUSCH transmission as the initial uplink message, where the identity information may be associated with a resource used for the PUSCH transmission.

In some examples of the method, first network node, apparatus, and non-transitory computer-readable medium described herein, obtaining the initial uplink message may include operations, features, means, or instructions for obtaining a PUCCH transmission or a SRS as the initial uplink message, where the identity information may be indicated by a sequence or scrambling identifier associated with the PUCCH transmission or the SRS.

In some examples of the method, first network node, apparatus, and non-transitory computer-readable medium described herein, obtaining the initial uplink message may include operations, features, means, or instructions for obtaining a PRACH transmission as the initial uplink message, where the identity information may be a dedicated preamble associated with the PRACH transmission.

In some examples of the method, first network node, apparatus, and non-transitory computer-readable medium described herein, the first cell may be associated with a first DU and the second cell may be associated with the first DU or a second DU different from the first DU.

In some examples of the method, first network node, apparatus, and non-transitory computer-readable medium described herein, obtaining the initial uplink message may include operations, features, means, or instructions for obtaining the initial uplink message in accordance with a resource allocation determined at the first DU.

In some examples of the method, first network node, apparatus, and non-transitory computer-readable medium described herein, the resource allocation includes a respective set of periodic or semi-persistent resources.

In some examples of the method, first network node, apparatus, and non-transitory computer-readable medium described herein, the response message includes a PDCCH transmission that includes a CRC that may be scrambled with an identifier of the first network node.

In some examples of the method, first network node, apparatus, and non-transitory computer-readable medium described herein, the identifier may be a C-RNTI associated with the second cell.

In some examples of the method, first network node, apparatus, and non-transitory computer-readable medium described herein, obtaining the initial uplink message may include operations, features, means, or instructions for obtaining the initial uplink message in accordance with one or more parameters associated with the second cell, where the one or more parameters may be based at least in part the first cell.

In some examples of the method, first network node, apparatus, and non-transitory computer-readable medium described herein, the one or more parameters include one or more transmission configuration indicator states, one or more timing advance values, or one or more power control parameters.

In some examples of the method, first network node, apparatus, and non-transitory computer-readable medium described herein, the initial uplink message may be one of a PUSCH transmission, a SRS, a PUCCH transmission, or a SR.

DETAILED DESCRIPTION

Figure 1:
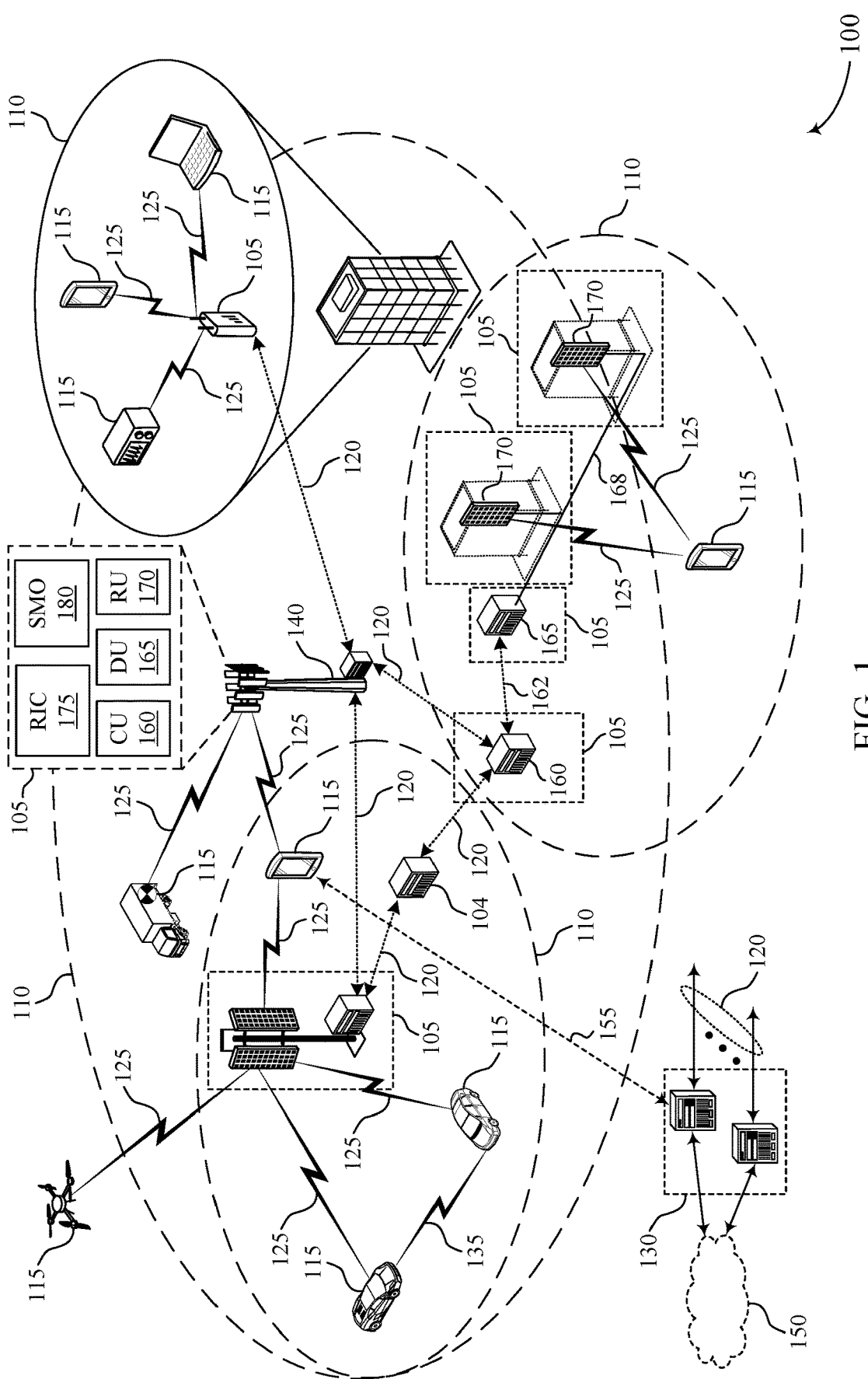
FIG. 1 shows an example of a wireless communications system that supports techniques for configuring an initial uplink transmission after a cell switch in accordance with one or more aspects of the present disclosure.

In some wireless communications systems, network nodes may perform initial access procedures to establish connections with a network. For example, a first network node (e.g., a user equipment (UE)) may perform an initial access procedure to establish a connection with a second network node (e.g., a network entity) via a first cell. As described herein, a cell may refer to a logical communication entity used for wireless communications with the network. In some examples, however, communications between the first network node and the second network node via the first cell may be interrupted (e.g., due to external factors, such as a physical blocking object, signal fading, or other phenomena) and cause the established connection to fail. To reduce a likelihood of the established connection failing, or to recover after the established connection fails, the first communication device may perform (or otherwise participate in) one or more mobility management procedures (e.g., to reestablish a connection with the second network node or to establish another connection with another network node). For example, the first network node may participate in a handover event to establish a connection with a third network node (e.g., the network entity or another network entity) via a second cell. The handover event may correspond to a handover of communications at the first network node from the first cell served by the second network node to the second cell served by the third network node.

In some examples, the handover event may be triggered by the second network node via lower layer signaling. For example, the second network node may transmit a cell switch command message to the first network node via lower layer signaling. The cell switch command message may trigger the handover of the first network node from the first cell (e.g., a source cell) to the second cell (e.g., a target cell). After the handover of the first network node from the first cell to the second cell, the first network node may transmit an initial uplink message via the second cell that identifies the first network node to the third network node (e.g., indicates an arrival of the first network node on the second cell). In some examples, the first network node may transmit a physical random access channel (PRACH) message that identifies the first network node to the third network node. For millimeter wave frequencies, the first network node may use directional beamforming to transmit the PRACH during a random access occasion that depends on a direction of the transmission. In some examples, however, the first network node may lack a mechanism for determining the direction to transmit the PRACH. As such, the first network node may be unable to determine the random access occasion to use for transmission of the PRACH. Additionally, random access occasions may occur relatively infrequently, which may lead to increased latency. To reduce latency, the first network node may transmit another type of uplink message, such as a physical uplink shared channel (PUSCH) message, a physical uplink control channel (PUCCH) message, or a sounding reference signal (SRS), among other examples. In some examples, however, the first network node may lack a mechanism to determine one or more resources to use for transmission of such messages.

Various aspects of the present disclosure relate to techniques for configuring an initial uplink transmission after a cell switch and, more specifically, to a framework for scheduling resources for transmission of initial uplink messages after handover events. For example, the second network node may configure the first network node with resources to transmit an initial uplink message after a handover of the first network node from the first cell to the second cell. The initial uplink message may be a first transmission scheduled to occur between the first network node and the third network node after the handover. The initial uplink message may be a PUSCH message, a PUCCH message, an SRS, or a PRACH message. In some examples, the second network node may indicate a resource allocation for transmission of the initial uplink message in a cell switch command message (e.g., lower layer signaling used to trigger the handover). In some other examples, the second network node may indicate one or multiple resource allocations to the first network node via a control message. In such examples, the second network node may use the cell switch command message to activate one or more of the indicated resource allocations for transmission of the initial uplink message. For example, the control message may indicate multiple resource allocations and the cell switch command message may include an indication to activate one of the multiple resource allocations for transmission of the initial uplink message. In some other examples, the control message may indicate a single resource allocation and reception of the cell switch command message at the first network node may activate (e.g., autonomously activate) the resource allocation for transmission of the initial uplink message.

Aspects of the subject matter described herein may be implemented to realize one or more of the following potential advantages. For example, the techniques employed by the described communication devices may provide benefits and enhancements to the operation of the communication devices, including reduced latency associated with handover events. The operations performed by the described communication devices to reduce latency for handover events may include configuring a network node with a resource allocation for transmission of an initial uplink message after a handover. In some examples, operations performed by the described communication devices may also support increased reliability of communications within a wireless communications system, among other benefits.

Aspects of the disclosure are initially described in the context of wireless communications systems, a network architecture, and process flows. Aspects of the disclosure are further illustrated by and described with reference to apparatus diagrams, system diagrams, and flowcharts that relate to techniques for configuring an initial uplink transmission after a cell switch.

FIG. 1 shows an example of a wireless communications system 100 that supports techniques for configuring an initial uplink transmission after a cell switch in accordance with one or more aspects of the present disclosure. The wireless communications system 100 may include one or more network entities 105, one or more UEs 115, and a core network 130. In some examples, the wireless communications system 100 may be a Long Term Evolution (LTE)

network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a CU 160, a DU 165, an RU 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for configuring an initial uplink transmission after a cell switch as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support initial access procedures for establishing connections with a network. For example, a first network node (e.g., a UE 115) may perform an initial access procedure to establish a connection with a source network node (e.g., a network entity 105) via a first cell. In some examples, the source network node may determine to handover communications with the UE 115 from the first cell (e.g., a source cell) to a second cell (e.g., a target cell). The second cell may be served by a target network node (e.g., another network entity 105). The source network node may transmit a cell switch command message via lower layer signaling to trigger the handover of the UE 115 from the first cell to the second cell. After the handover, the UE 115 may transmit an initial uplink message that identifies the UE 115 to the target network node. In some examples, the UE 115 may use directional beamforming to transmit a PRACH message that identifies the UE 115 to the target network node. In some other examples, the UE may transmit another type of uplink message, such as a PUSCH message, a PUCCH message, or an SRS, among other examples. In some cases, however, the UE 115 may lack a mechanism to determine one or more resources to use for transmission of such messages after handover events.

In some examples, the source network node may configure the UE 115 with resources to transmit an initial uplink message after the handover of the UE 115 from the first cell to the second cell. For example, in accordance with a framework for scheduling resources for transmission of initial uplink messages after handover events, the source network node may indicate a resource allocation to the UE 115 for transmission of the initial uplink message after the handover. In some examples, the source network node may indicate the resource allocation for transmission of the initial uplink message in the cell switch command message (e.g., the lower layer signaling used to trigger the handover).

In some other examples, the source network node may configure (e.g., indicate) one or multiple resource allocations to the UE 115 via a control message. In such examples, the source network node may use the cell switch command to activate one or more of the configured resource allocations for transmission of the initial uplink message. For example, the control message may configure multiple resource allocations and the cell switch command message may include an indication to activate one of the multiple resource allocations for transmission of the initial uplink message. In some other examples, the control message may configure a single resource allocation and reception of the cell switch command message at the UE 115 may activate (e.g., autonomously activate) the resource allocation for transmission of the initial uplink message. After the handover, the UE 115 may transmit the initial uplink message to the target network node via the second cell and in accordance with the activated resource allocation. In some examples, configuring the UE 115 with the resource allocation for transmission of the initial uplink message after the handover may lead to increased reliability of communications within the wireless communications system 100, among other benefits.

Figure 2:
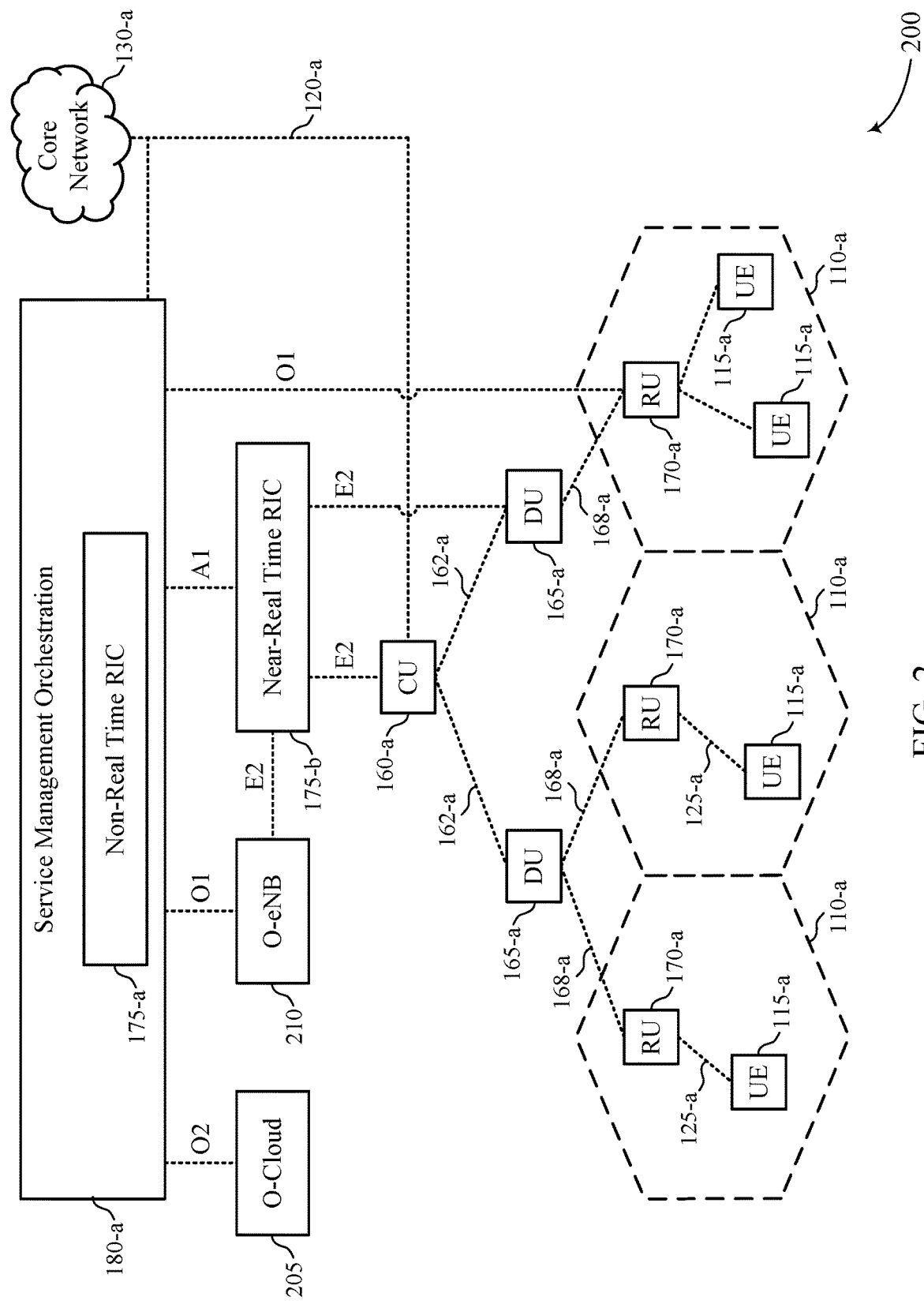
FIG. 2 shows an example of a network architecture that supports techniques for configuring an initial uplink transmission after a cell switch in accordance with one or more aspects of the present disclosure.

FIG. 2 shows an example of a network architecture 200 (e.g., a disaggregated base station architecture, a disaggregated RAN architecture) that supports techniques for configuring an initial uplink transmission after a cell switch in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*. RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) based on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, PRACH extraction and filtering, or the like), or both, based on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

In some examples, a source network node may configure a UE 115 with resources to transmit an initial uplink message after a handover of the UE 115 from a source cell served by the source network node to a target cell served by a target network node. For example, in accordance with a framework for scheduling resources for transmission of initial uplink messages after handover events, the source network node may indicate a resource allocation to the UE 115 for transmission of the initial uplink message after the handover. In some examples, the source cell and the target cell may be associated with a DU 165-*a* (e.g., a same DU 165-*a*). For example, the source network node (e.g., serving the source cell) and the target network node (serving the target cell) may correspond to a single DU 165-*a*. Alternatively, the source network node may correspond to a first RU 170-*a* and the target network node may correspond to a second RU 170-*a*, in which the first RU 170-*a* and the second RU 170-*a* may be associated with (e.g., in communication with) the same DU 165-*a*. In such examples, the handover of the UE 115 from the source cell to the target cell may be referred to as an intra-DU handover. In some examples of intra-DU handovers, the DU 165-*a* or a CU 160-*a* that may be associated with (e.g., may be common to, may be in communication with) the DU 165-*a* may determine the resource allocation for transmission of the initial uplink message after the handover.

In some other examples, the source cell and the target cell may be associated with multiple DUs 165-*a* (e.g., different DUs 165-*a*). For example, the source network node (e.g., serving the source cell) may correspond to a first DU 165-*a* and the target network node (serving the target cell) may correspond to a second DU 165-*a*. Alternatively, the source network node may correspond to a first RU 170-*a* associated with (e.g., in communication with) the first DU 165-*a* and the target network node may correspond to a second RU 170-*a* associated with (e.g., in communication with) the second DU 165-*a*. In such examples, the handover of the UE 115 from the source cell to the target cell may be referred to as an inter-DU handover.

In some examples of inter-DU handovers, DUs 165-*a* associated with target cells, such as the second DU 165-*a*, may determine resource allocations used for transmission of initial uplink messages after handover events. For example, the first DU 165-*a* may indicate, to the second DU 165-*a*, multiple resource allocations configured at (or otherwise available for use by) the UE 115. In such an example, the second DU 165-*a* may select one or more of the indicated resource allocations for transmission of the initial uplink message after the handover of the UE 115. The second DU 165-*a* may indicate the one or more selected resource allocation to a CU 160-*a* that may be associated with (e.g., in communication with) the first DU 165-*a* and the second DU 165-*a*. Accordingly, the CU 160-*a* may indicate (e.g., relay) the one or more selected resource allocations to the first DU 165-*a*. The first DU 165-*a* may indicate (e.g., configure, activate, or both) one of the selected resource allocations to the UE 115 for transmission of the initial uplink message. For example, the first DU 165-*a* may activate one of the selected resource allocations at the UE 115 (e.g., via a cell switch command message) for transmission of the uplink message after the handover. After the handover, the UE 115 may transmit the initial uplink message via the target cell in accordance with the activated resource allocation. In some examples, the framework for scheduling resources for transmission of initial uplink messages after handover events, as described herein, may lead to reduce latency and increased reliability of communications within wireless communications systems, among other benefits.

Figure 3:
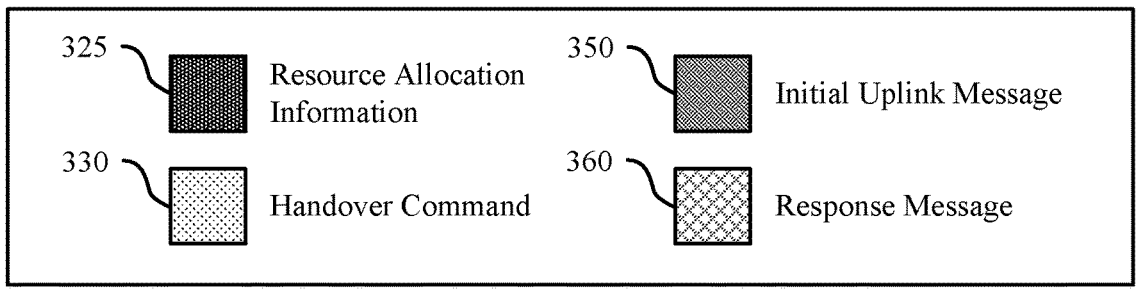
FIG. 3 shows an example of a wireless communications system that supports techniques for configuring an initial uplink transmission after a cell switch in accordance with one or more aspects of the present disclosure.
Figure 3:
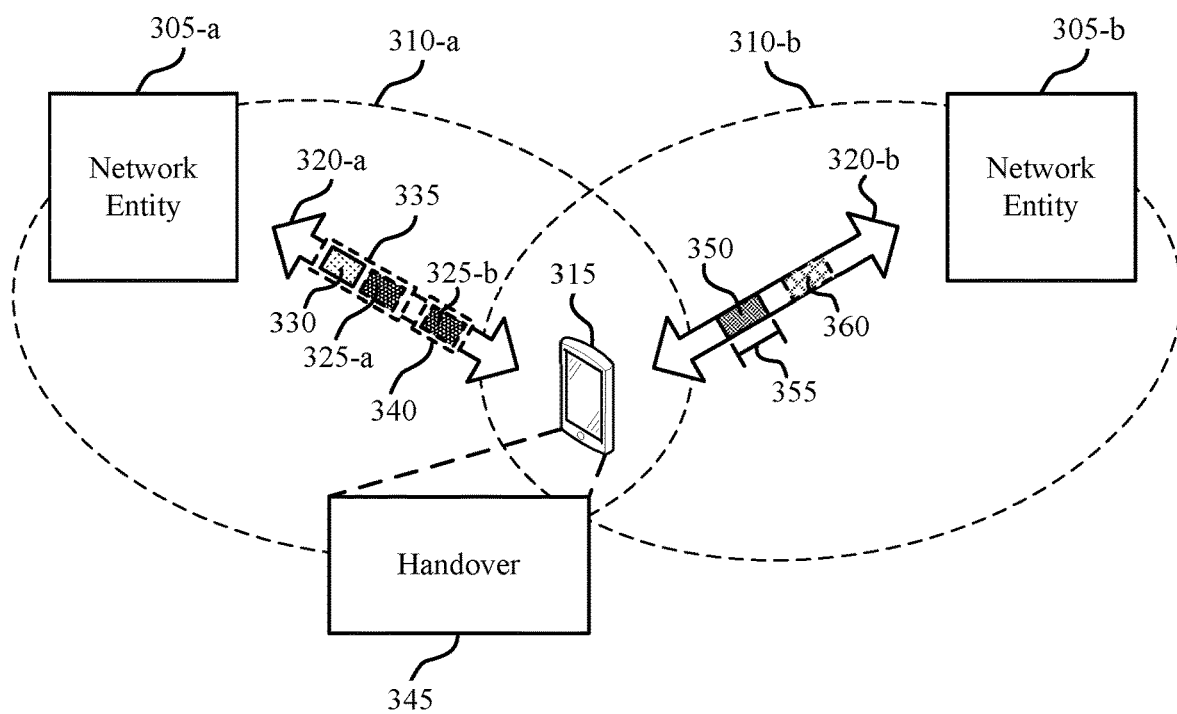

FIG. 3 shows an example of a wireless communications system 300 that supports techniques for configuring an initial uplink transmission after a cell switch in accordance with one or more aspects of the present disclosure. In some examples, the wireless communications system 300 may implement or be implemented at one or more aspects of the wireless communications system 100 and the network architecture 200. For example, the wireless communications system 300 may include a UE 315, which may be an example of a UE 115 (or another network node) illustrated by and described with reference to FIGS. 1 and 2. The wireless communications system 300 may also include a network entity 305-*a* and a network entity 305-*b*, which may be (e.g., may each be) an example of one or more of the network entities 105 (e.g., a CU, a DU, an RU, a base station, an IAB node, or one or more other network nodes) as described with reference to FIG. 1.

The UE 315 may communicate with the network entity 305-*a* via a communication link 320-*a* and with the network entity 305-*b* via a communication link 320-*b*. The communication links 320 may be examples of a communication link 125 (e.g., access links, Uu interfaces) illustrated by and described with reference to FIG. 1. For example, the communication links 320 may be examples of downlinks or uplinks, or both. The UE 315 may communicate with the network entity 305-*a* within a coverage area 310-*a* and with the network entity 305-*b* via a coverage area 310-*b*. The coverage areas 310 may be examples of a coverage area 110 illustrated by and described with reference to FIG. 1. For example, the network entity 305-*a* may serve a first cell (e.g., a first logical communication entity) providing the coverage area 310-*a* and the network entity 305-*b* may serve a second cell (e.g., a second logical communication entity) providing the coverage area 310-*b*. That is, the network entity 305-*a* may support wired or wireless communications with the coverage area 310-*a* via the first cell and the network entity 305-*b* may support wired or wireless communications within the coverage area 310-*b* via the second cell. In the example of FIG. 3, the first cell may be an example of a source cell (e.g., an activated serving cell, which may be referred to as a serving cell) and the second cell may be an example of a target cell (e.g., a non-activated serving cell, which may be referred to as a non-serving cell). In other words, the network entity 305-*a* may be an example of a source network entity (e.g., a source gNB, a serving network entity) and the network entity 305-*b* may be an example of a target network entity (e.g., a target gNB, a non-serving network entity). The wireless communications system 300 may include features for improved communications between the network entities 305 and the UE 315, among other possible benefits.

The UE 315 may be an example of a mobile UE that may travel throughout (e.g., and between) the coverage areas 310. In some examples, the UE 315 may perform an initial access procedure to establish a connection with the network entity 305-*a*. While in a connected mode (e.g., a radio resource control (RRC) connected mode), the UE 315 may receive downlink communications from (or transmit uplink communications to) the network entity 305-*a* via the first cell. As the UE 315 travels throughout the coverage area 310-*a* (e.g., or into another geographic coverage area, such as the coverage area 310-*b*), the established connection (e.g., the communication link 320-*a*, which may also be referred to as a radio link or a link) may be susceptible to blockages and degradation, which may cause interruptions in the radio link or a radio link failure. That is, the downlink communications from (or uplink communications to) the network entity 305-*a* may be dropped. To recover after a radio link failure (or to reduce the likelihood of radio link failures occurring), the UE 315 may perform one or more mobility management procedures (e.g., e.g., to reestablish a connection with the network entity 305-*a* or establish a connection with another network entity, such as the network entity 305-*b*). In some examples, the UE 315 may participate in a handover event (e.g., perform a handover procedure) to establish a connection with another network entity (e.g., the network entity 305-*b*). For example, the UE 315 may participate in a handover event, in which communications at the UE 315 may be handed over from the first cell (e.g., served by the network entity 305-*a*) to the second cell (e.g., served by the network entity 305-*b*). In some examples, the network entity 305-*a* and the network entity 305-*b* may communicate (e.g., coordinate) the handover of the UE 315 from the first cell to the second cell. For example, the network entity 305-*a* may transmit a request to the network entity 305-*b* to handover the UE 315 (e.g., switch communications with the UE 315) from the first cell to the second cell.

A handover event (e.g., a cell switch from the first cell to the second cell) may be triggered via lower layer signaling, such as L1 or L2 signaling. For example, the handover event may be triggered via L1 or L2 signaling (e.g., via L1 or L2 messages) as part of a Layer 1/2 Triggered Mobility (LTM) procedure. That is, in accordance with an LTM procedure, the network entity 305-*a* (e.g., a source network entity) may transmit a cell switch command message (e.g., a handover command) via L1 signaling (e.g., via downlink control information (DCI)) or via L2 signaling (e.g., via a MAC control element (MAC-CE)). In some examples, transmitting a cell switch command message via L1 or L2 signaling (e.g., triggering a cell switch via DCI or a MAC-CE) may reduce a latency associated with handover events, among other benefits.

As illustrated in the example of FIG. 3, the network entity 305-*a* may transmit a cell switch command message to trigger a handover 345 of the UE 315 from the first cell (e.g., the source cell served by the network entity 305-*a*) to the second cell (e.g., the target cell served by the network entity 305-*b*). In some examples, the network entity 305-*a* and the network entity 305-*b* may be associated with a single DU (e.g., may be a DU or be in connection with a same DU). That is, a same DU may host lower protocol layers (e.g., L1 and L2) for the network entity 305-*a* and the network entity 305-*b*. In other words, L1 and L2 signaling transmitted (or otherwise output) from the network entity 305-*a* and the network entity 305-*b* may be generated via a same DU. In such examples, a handover from the first cell to the second cell may be referred to as an intra-DU handover (e.g., the cell switch may be intra-DU). In some other examples, the network entity 305-*a* and the network entity 305-*b* may be associated with multiple DUs (e.g., may be different DUs or in connection with different DUs). For example, the network entity 305-*a* may be associated with a first DU and the network entity 305-*b* may be associated with a second DU. In such an example, the first DU may host lower protocol layers (e.g., L1 and L2) for the network entity 305-*a* and the second DU may host lower protocol layers (e.g., L1 and L2) for the network entity 305-*b*. For example, L1 and L2 signaling transmitted from the network entity 305-*a* may be generated via the first DU and L1 and L2 signaling transmitted from the network entity 305-*b* may be generated via the second DU. In such an example, a handover from the first cell to the second cell may be referred to as an inter-DU handover (e.g., the cell switch may be inter-DU).

In some examples, such as after the handover 345 (e.g., the cell switch) of the UE 315 from the first cell to the second cell, the UE 315 may transmit uplink signaling to establish a connection to the second cell. For example, after the cell switch, the UE 315 may send a first uplink transmission (e.g., an initial uplink message) to establish a connection to the second cell (e.g., the target cell, a new serving cell). The first uplink transmission (e.g., the initial uplink message) may indicate an arrival of the UE 315 to the second cell. That is, after the cell switch (e.g., and before communications may continue with the network entity 305-*b*), the UE 315 may indicate that the UE 315 arrived at the second cell. In other words, after the handover 345, the UE 315 may transmit the initial uplink message, which may identify the UE 315 to the network entity 305-*b* (e.g., the network entity serving the second cell).

The first uplink transmission after the handover 345 (e.g., the initial uplink message) may be a PRACH or one or more other types of uplink transmissions. For example, after the handover 345 of the UE 315 to the second cell, the UE 315 may perform a random access procedure, also referred to as a random access channel (RACH) procedure, to establish a connection with the second cell. In such an example, the first uplink transmission scheduled to occur between the UE 315 and the network entity 305-*b* (e.g., the initial uplink message) may be a PRACH message that includes a random access preamble associated with (e.g., dedicated to) the UE 315. That is, after the handover 345, the UE 315 may transmit a PRACH message to the network entity 305-*b* that includes a random access preamble identifying the UE 315. In some examples, such as for millimeter wave frequencies (e.g., frequencies that may be included in frequency range 2 (FR2)), the UE 315 may use directional beamforming to transmit the PRACH during a random access occasion. In such examples (e.g., for a directional RACH procedure), the random access occasion used to transmit the PRACH may depend on a direction of the transmission (e.g., due to a geographic location of the network entity 305-*b* and the UE 315). That is, for directional RACH, random access occasions (e.g., random access resources) may be allocated per direction. In some examples, however, the UE 315 may lack a mechanism, much less an effective mechanism, for determining a direction (e.g., which direction) to transmit the PRACH. As such, the UE 315 may be unable to determine a random access occasion (e.g., which random access occasion) to use for the PRACH transmission.

Additionally, or alternatively, random access occasions for directional RACH may occur relatively infrequently. For example, a duration between the handover 345 (e.g., a handover event) and a random access occasion (e.g., a RACH occasion) associated with the direction of the transmission may be relatively long, which may lead to increased latency associated with the first uplink transmission (e.g., may delay continued communications via the second cell). In other words, some RACH procedures, such as directional RACH procedures, may be associated with a relatively long delay due to time sparsity of RACH occasion. In some examples, a relatively long delay associated with a RACH procedure used at the UE 315 (e.g., after the handover 345) may lead to increased latency for communications at the UE 315

To reduce latency, the UE 315 may use one or more other types of uplink message to identify a presence of the UE 315 to the second cell (e.g., after the handover 345). For example, the UE 315 may transmit the one or more other types of uplink message in addition to (e.g., prior to) or in lieu of the PRACH. In some examples, the initial uplink message may include a PUSCH message, a PUCCH message, or an SRS, among other examples of uplink messages. That is, after the handover 345 of the UE 315 to the second cell, the UE 315 may transmit a PUSCH message, a PUCCH message, or an SRS that identifies a presence (e.g., indicates an arrival) of the UE 315 to the second cell. PUSCH, PUCCH, and SRS transmissions may be dynamically scheduled (e.g., dynamically configured). In some examples, however, the UE 315 may lack a mechanism, much less an effective mechanism, to determine one or more resources (e.g., which resources) to use for such transmissions (e.g., for PUSCH, PUCCH, or SRS transmissions after a handover).

In some examples, one or more techniques for configuring an initial uplink transmission after a cell switch, as described herein, may provide a framework for scheduling resources for transmission of initial uplink messages after handover events. As illustrated in the example of FIG. 3, the UE 315 may receive resource allocation information 325 (e.g., resource allocation information 325-*a* or resource allocation information 325-*b*) via the first cell. The resource allocation information 325 (e.g., the resource allocation information 325-a, the resource allocation information 325-b) may schedule a first uplink transmission between the UE 315 and the network entity 305-b after the handover 345 (e.g., and via the resource allocation 355). For example, the resource allocation information (e.g., the resource allocation information 325-a, the resource allocation information 325-b) may indicate a resource allocation 355 for transmission of the initial uplink message 350 via the second cell. Additionally, the UE 315 may receive a handover command 330 via the first cell. The handover command 330 may trigger the handover 345 of the UE 315 from the first cell to the second cell.

In some examples, the UE 315 may receive the resource allocation information 325-a and the handover command 330 via a cell switch command message 335. For example, the UE 315 may receive the cell switch command message 335 from the network entity 305-a via the first cell. The cell switch command message 335 message may trigger the handover 345 of the UE 315 from the first cell to the second cell and schedule (e.g., dynamically schedule) the first uplink transmission on the second cell (e.g., the new serving cell) via the resource allocation 355. That is, the cell switch command message 335 may include both the handover command 330 (e.g., to trigger the handover 345) and the resource allocation information 325-a (e.g., to schedule the first uplink transmission).

In some other examples, the UE 315 may receive the resource allocation information 325-b via a control message 340 (e.g., RRC signaling) and the handover command 330 via the cell switch command message 335. For example, the UE 315 may receive the control message 340 that includes the resource allocation information 325-b. The resource allocation information 325-b may indicate (e.g., schedules, configures) one or more resource allocations for transmission of initial uplink messages after cell handovers (e.g., including the resource allocation 355 for transmission of the initial uplink message 350 via the second cell). In such examples, the cell switch command message 335 may trigger the handover 345 and activate one of the indicated resource allocations (e.g., the resource allocation 355) for the first uplink transmission after the handover 345. That is, the cell switch command message 335 may include the handover command 330 (e.g., to trigger the handover 345) and indicate activation of the resource allocation 355 for transmission of the initial uplink message 350 via the second cell.

The cell switch command message 335 may include an indication that indicates activation of the resource allocation 355 or reception of the cell switch command message 335 at the UE 315 may indicate activation of the resource allocation 355. For example, the control message 340 may configure multiple resource allocations (e.g., via the resource allocation information 325-b) and the cell switch command message 335 may include an indication to activate one of the multiple resource allocations (e.g., via the handover command 330 or some other type of indication). That is, in some examples, the control message 340 may indicate the resource allocation 355 and one or more other resource allocations for transmission of initial uplink messages after cell handovers. In such examples, the cell switch command message 335 may include the handover command 330 and an indication to activate the resource allocation 355 for transmission of the initial uplink message 350 after the handover 345. In some other examples, the control message 340 may indicate a single resource allocation (e.g., may configure the resource allocation 355 via the resource allocation information 325-b) and reception of the cell switch command message 335 (e.g., including the handover command 330) may activate the resource allocation 355. In other words, the resource allocation 355 may be configured (e.g., via RRC signaling) for transmission of initial uplink messages after cell handovers and autonomously activated by the cell switch command message 335.

In some examples, such as in response to the handover command 330, the UE 315 may transmit the initial uplink message 350 via the second cell in accordance with the resource allocation 355 (e.g., to the network entity 305-b using the resource allocation 355). The initial uplink message 350 may identify the UE 315 to the network entity 305-b (e.g., indicate an arrival of the UE 315 on the second cell). For example, the initial uplink message 350 may include identity information that identifies the UE 315 to the network entity 305-b. That is, for the first uplink transmission after the handover 345, the UE 315 indicate identity information of the UE 315 to the second cell (e.g., the target cell, the new serving cell).

In some examples, the first uplink transmission (e.g., of the initial uplink message 350) may be a PUSCH transmission. For example, the UE 315 may transmit a PUSCH transmission as the initial uplink message 350. The identity information may be a radio network temporary identifier (RNTI), such as a cell RNTI (C-RNTI), included in the PUSCH transmission (e.g., included in a MAC-CE transmitted via the PUSCH). For example, the PUSCH may carry a C-RNTI MAC-CE that identifies the UE 315 to the network entity 305-b. The C-RNTI MAC CE may be identified by a MAC subheader (e.g., with a logical channel identifier (LCID)). In some other examples, the identity information may be implicitly indicated (e.g., to the network entity 305-b) by one or more of the resources used for the PUSCH transmission (e.g., a PUSCH resource). That is, the identity information of the UE 315 may be associated with (e.g., implicitly indicated via, correspond to) the resource allocation 355.

In some examples, the first uplink transmission (e.g., of the initial uplink message 350) may be a PUCCH transmission or an SRS. For example, the UE 315 may transmit a PUCCH transmission or an SRS as the initial uplink message 350. In such an example, a sequence (e.g., a particular sequence) or a scrambling identifier may be used to indicate the identity of the UE 315. In other words, identity information of the UE 315 may be indicated by a sequence or scrambling identifier associated with the PUCCH transmission or the SRS.

In some examples, the first uplink transmission (e.g., of the initial uplink message 350) may be a PRACH transmission. For example, the UE 315 may transmit a PRACH transmission as the initial uplink message 350. In such an example, the UE 315 may be configured to use a random access preamble (e.g., a dedicated preamble) to identify the UE 315 to the network entity 305-b. That is, the identity information may include a dedicated preamble associated with the PRACH transmission.

The UE 315 may receive a message (e.g., a response message 360) from the network entity 305-b in response to the initial uplink message 350. That is, the response message 360 may be responsive to the initial uplink message 350. In other words, the UE 315 may receive the response message 360 in response to the initial uplink message 350. In some examples, the initial uplink message 350 (e.g., the first uplink transmissions after the handover 345) may be a PRACH transmission (e.g., a first message transmitted as part of a random access procedure). In such examples, the response message 360 may be a random access response (RAR) message (e.g., a second message transmitted as part of the random access procedure). In other words, the response message 360 may be a RAR message when the initial uplink message 350 may be a PRACH transmission.

In some other examples, the first uplink transmission after the handover 345 (e.g., the initial uplink message 350) may be a PUSCH transmission, a PUCCH transmission (e.g., a scheduling request (SR)), or an SRS. In such examples, the response message 360 may be a PDCCH transmission. For example, the response message 360 may be a PDCCH whose cyclic redundancy check (CRC) may be scrambled with a UE identifier (UE ID) corresponding to the UE 315. The UE ID may include an RNTI, such as a C-RNTI or a modulation coding scheme (MCS) C-RNTI (MCS-C-RNTI). That is, the response message 360 may include a PDCCH transmission that includes a CRC scrambled with an identifier of the UE 315 (e.g., an RNTI, or another type of UE ID). In some examples, the RNTI may change after the cell switch. For example, the UE 315 may be configured (e.g., (e.g., via an RNTI configuration, such as a C-RNTI configuration) with a first RNTI associated with the first cell and a second RNTI associated with the second cell. The UE 315 may use the first RNTI for communications with the network entity 305-a via the first cell and the second RNTI for communications (e.g., the first uplink transmission) via the second cell. The network entity 305-a may indicate the second RNTI to the UE 315 (e.g., via the first cell before transmission of the handover command 330) or the UE 315 may be otherwise configured with the second RNTI.

The UE 315 may transmit the initial uplink message 350 in accordance with one or more parameters associated with the second cell. In some examples, the UE 315 may determine the one or more parameters associated with the second cell via the first cell. For example, the network entity 305-a may indicate the one or more parameters associated with the second cell to the UE 315 via the first cell (e.g., via the cell switch command message) or the UE 315 may be otherwise configured with the one or more parameters associated with the second cell. That is, in some examples, the cell switch command message 335 may include the handover command 330 and an indication of one or more parameters associated with the second cell. In some other examples, the UE 315 may determine the one or more parameters associated with the second cell via a rule or from one or more configured (e.g., preconfigured) values.

The one or more parameters may include one or more transmission configuration indicator (TCI) states, one or more timing advance values, or one or more power control parameters, among other examples of parameters used for uplink transmissions or downlink receptions. For example, the UE 315 may be configured with a TCI state pool (e.g., a set of one or more TCI states) of candidate cells. That is, the UE 315 may be configured with a TCI state pool that may include one or more TCI states corresponding to (e.g., each corresponding to) one or more candidate cells. In some examples, the network entity 305-a may configure the UE 315 with the TCI state pool via a configuration for the first cell (e.g., via a serving cell configuration). That is, a TCI state pool configuration for candidate cells may be included in the serving cell configuration. In some other examples, the TCI state pool configuration for candidate cells may be configured independently from the serving cell configuration (e.g., independently from a candidate cell configuration). In some examples, the network entity 305-a may configure the UE 315 with the TCI state pool via a cell group configuration. That is, the TCI state pool configuration may be provided to the UE 315 via a candidate cell configuration of a cell group (e.g., via a common configuration information element (IE), such as a CellGroupConfig IE for a group of cells). In such examples, a configuration for a cell (e.g., a respective configuration for each cell) may be derived (e.g., at the UE 315) based on a difference between a configuration of the cell and the configuration for the cell group (e.g., by a delta configuration of the cell and the configuration indicated via the CellGroupConfig IE). In some examples, the UE 315 may be configured with one or more TCI states to use for transmission of the initial uplink message 350 (e.g., for the first uplink transmission). For example, the UE 315 may be configured with one or multiple (e.g., two) TCI states from the TCI pool to use for transmission of the initial uplink message 350. In some other examples, such as examples in which the UE 315 may not use or support a unified TCI state, the UE 315 may use (e.g., may be configured to use) a beam (e.g., a TCI state) associated with a previous uplink beam indication. In other words, the UE 315 may not use or support a unified TCI state and the network entity 305-a (or another network entity) may refrain from configuring the UE 315 with a TCI state pool. In such examples, the UE 315 may use a previous uplink beam indication (e.g., to determine a TCI state to use for the initial uplink message 350).

In some examples, the network entity 305-a may indicate one or more TCI states to the UE 315 prior to (or via) the cell switch command message 335. That is, the TCI state (e.g., an indicated TCI) may be configured at the UE 315 before the UE 315 receives the cell switch command message 335 (e.g., the handover command 330) or the TCI state may be indicated to the UE 315 with the cell switch command message 335. That is, in some examples, the cell switch command message 335 may include the handover command 330 and an indication of one or more TCI states to use for the initial uplink message 350. In such examples, transmission of the initial uplink message 350 (e.g., the first uplink transmission) may follow one or more of the indicated TCI states. For example, the network entity 305-b (e.g., the new serving cell) may operate in a multiple TRP (mTRP) mode. In such examples, the UE 315 may be configured with multiple TCI states associated with the second cell (e.g., the new serving cell). For example, the network entity 305-a may indicate multiple TCI states (e.g., two or some other suitable quantity of TCI states) to the UE 315. The UE 315 may use one or more of the indicated TCI states for transmission of the initial uplink message 350. For example, if two TCI states are indicated to the UE 315 (e.g., via the cell switch command message 335 or some other message transmitted via the first cell), the TCI state used for transmission of the initial uplink message 350 (e.g., for the first uplink transmission after the handover 345) may be one or both of the indicated TCI states. The UE 315 may select one or more TCI states (e.g., from the multiple indicated TCI states) to use for the first uplink transmission after the handover based on a rule (e.g., a static rule) or the network entity 305-a may indicate one or more TCI states (e.g., which TCI states) to the UE 315.

In some examples, a quantity (e.g., a maximum quantity or an otherwise suitable quantity) of configured or activated candidate cells for LTM (e.g., for an LTM measurement report) may be based on one or more capabilities of the UE 315 (e.g., a UE capability). Additionally, or alternatively, a quantity (e.g., a minimum quantity, a maximum quantity, an otherwise suitable quantity) of beams per LTM candidate cell or across multiple LTM candidate cells (e.g., all LTM cells) that the UE 315 may report in a report configuration (e.g., in an LTM report) may be based on one or more capabilities of the UE 315 (e.g., a UE capability). That is, the network entity 305-a (or another network entity) may configure the UE 315 with a quantity of beams to report in an LTM report and, in some examples, the quantity of beams may be based on one or more capabilities of the UE 315.

Additionally, or alternatively, the UE 315 may be configured with one or more timing advance values to use for transmission of the initial uplink message 350 (e.g., for the first uplink transmission). For example, the network entity 305-b (e.g., and the network entity 305-a) may operate in a multiple DCI (mDCI) mTRP mode in which multiple timing advance values (e.g., up to two or some other suitable quantity of timing advance values) may be configured for uplink transmissions (e.g., including the transmission of the initial uplink message 350). The timing advance values may be indicated to the UE 315 in the cell switch command message 335 (e.g., the handover command 330) or the timing advance values may be otherwise configured at the UE 315 (e.g., before transmission of cell switch command message 335). In some examples, a timing advance value used for transmission of the initial uplink message 350 (e.g., for the first uplink transmission after the handover 345) may be based on a rule or a configured value. For example, the network entity 305-a (e.g., a gNB) may indicate a timing advance value to the UE 315 (e.g., via a field in the cell switch command message 335). In some other examples, a timing advance value may be determined at the UE 315 based on a rule (e.g., a static rule). For example, the UE 315 may determine a timing advance value based on a timing advance group (TAG) or a CORESET pool identifier associated with a TCI state. That is, the timing advance value may be based on a TCI state configured for transmission of the initial uplink message 350.

In some examples, the UE 315 may be configured with one or more power control parameters to use for transmission of the initial uplink message 350 (e.g., for the first uplink transmission). The power control parameters may be based on (or include) one or more parameters associated with a path loss. For example, the UE 315 may determine a transmission power for the initial uplink message 350 based on a pathloss measured at the UE 315. To measure the pathloss, the UE 315 may use a downlink reference signal (e.g., a pathloss reference signal) and one or more equations (e.g., that include one or more power control parameter). The network entity 305-a may transmit the pathloss reference signal to the UE 315 via the first cell or the network entity 305-a may configure the UE 315 with a path loss reference signal to be transmitted via the second cell. For example, the network entity 305-a may indicate (or the UE 315 may be otherwise configured with) a path loss reference signal and one or more power control parameters to the UE 315. The one or more power control parameters may be examples of power control parameters included in equations used to determine a transmission power at the UE 315, such as a compensation coefficient (a) associated with a path loss or a transmission power (Po). In other words, a pathloss reference signal and one or more power control parameters (Po, a) for transmission of the initial uplink message 350 may be configured (e.g., preconfigured) or indicate to the UE 315. In some examples, the pathloss reference signal and one or more power control parameters (Po, a) for the first uplink transmission after the handover 345 (e.g., for the initial uplink message 350) may be indicate to the UE 315 via the cell switch command message 335. In some examples, one or more power control parameters may be configured (e.g., preconfigured) the UE 315 as part of an uplink configuration (e.g., an uplink TCI state RRC configuration).

Additionally, or alternatively, the one or more parameters may include a closed loop index of the power control parameters for transmission of the initial uplink message 350 (e.g., for the first uplink transmission). In some examples, the UE 315 may determine the closed loop index based on a default value. In some other examples, the network entity 305-a may indicate (e.g., signal) the closed loop index to the UE 315 via the cell switch command message 335 or one or more other message transmitted via the first cell (e.g., before the cell switch command message 335).

In some examples, such as after transmission of the initial uplink message 350, the UE 315 may monitor a CORESET (e.g., for the response message 360). The network entity 305-a may indicate the CORESET to the UE 315 or the UE 315 may be otherwise configured with CORESET. For example, the UE 315 may receive an indication of a CORESET associated with the second cell via the first cell. In such an example, the UE 315 may monitor the CORESET for the response message 360 (e.g., after, such as in response to, transmission of the initial uplink message 350). In some examples, the network entity 305-a may indicate the CORESET to the UE 315 via the cell switch command message 335 (e.g., via the handover command 330). That is, the CORESET used to monitor for the response message 360 (e.g., a response PDCCH) may be indicated to the UE 315 via the cell switch command message 335 or the CORESET may be otherwise configured at the UE 315.

In some examples, the UE 315 may monitor the CORESET in accordance with a TCI state associated with the second cell. For example, the network entity 305-a may indicate a TCI state associated with the second cell to the UE 315. In some examples, the network entity 305-a may indicate the TCI state to the UE 315 via the cell switch command message 335 (e.g., via the handover command 330) or one or more other message transmitted to the UE 315 prior to the cell switch command message 335. In other words, the TCI used for receptions via the CORESET may follow the indicated TCI for the second cell (e.g., the new serving cell). Additionally, or alternatively, the UE 315 may use the indicated TCI state for downlink receptions (e.g., PDSCH receptions and PDCCH receptions) via the second cell. In some examples, configuring the UE 315 with the resource allocation 355 for transmission of the initial uplink message 350 (e.g., the first uplink transmission after cell switch) may lead to reduce latency, among other benefits.

Figure 4:
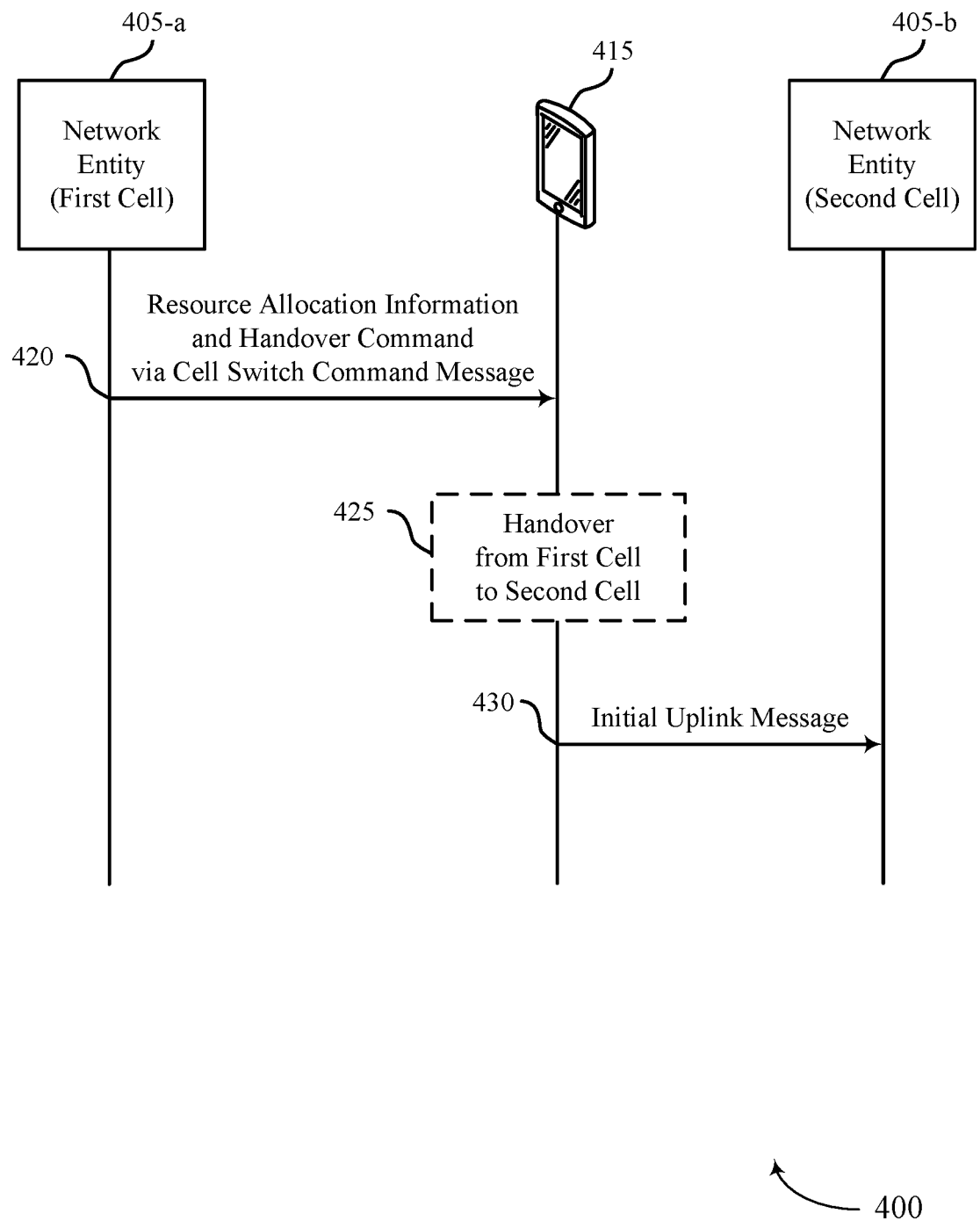
FIGS. 4 and 5 each show an example of a process flow that supports techniques for configuring an initial uplink transmission after a cell switch in accordance with one or more aspects of the present disclosure.

FIG. 4 shows an example of a process flow 400 that supports techniques for configuring an initial uplink transmission after a cell switch in accordance with one or more aspects of the present disclosure. In some examples, the process flow 400 may implement one or more aspects of wireless communications system 100, the network architecture 200, and the wireless communications system 300. For example, the process flow 400 may include example operations associated with a network entity 405-a, a network entity 405-b, and a UE 415, which may be examples of the corresponding devices illustrated by and described with reference to FIGS. 1 through 3. The operations performed by the network entity 405-a, the network entity 405-b, and the UE 415 may support improvements to communications between the UE 415 and the network entities 405, among other benefits. In the following description of the process flow 400, the operations between the UE 415 and the network entities 405 may occur in a different order than the example order shown. Additionally, or alternatively, the operations performed by the UE 415 and the network entities 405 may be performed in different orders or at different times. Some operations may also be omitted and some operations may be combined. In the example of FIG. 4, the network entity 405-*a* may serve a first cell and the network entity 405-*b* may serve a second cell. That is, operations associated the network entity 405-*a* (e.g., transmissions from the network entity 405-*a* or receptions at the network entity 405-*a*) may occur via the first cell and operations associated the network entity 405-*b* (e.g., transmissions from the network entity 405-*b* or receptions at the network entity 405-*b*) may occur via the second cell.

The UE 415 and the network entities 405 may support a framework for scheduling resources for transmission of initial uplink messages after handover events. For example, in accordance with one or more techniques for configuring an initial uplink transmission after a cell switch, as described herein, the network entity 405-*a* may configure the UE 415 with resources for transmission of an initial uplink message after communications at the UE 415 switch (e.g., are handed over) from the first cell to the second cell. The first cell may be an example of a source cell (e.g., a serving cell) illustrated by and described with reference to FIG. 3. Additionally, or alternatively, the second cell may be an example of a target cell (e.g., a non-serving cell) illustrated by and described with reference to FIG. 3. As illustrated in the example of FIG. 4, the network entity 405-*a* may transmit a cell switch command message to the UE 415. The cell switch command message may schedule (e.g., dynamically schedule) a first uplink transmission for the UE 415 on the second cell (e.g., a new serving cell). For example, the network entity 405-*a* may use the cell switch command message to trigger the cell switch and configure the UE 415 with resources for transmission of an initial uplink message after the cell switch (e.g., from the first cell to the second cell)

At 420, the UE 415 may receive resource allocation information and a handover command via a cell switch command message. The resource allocation information may be an example of resource allocation information illustrated by and described with reference to FIG. 3. For example, the resource allocation information may indicate a resource allocation for transmission of an initial uplink message via the second cell. The initial uplink message may correspond to a first uplink transmission scheduled to occur between the UE 415 and the network entity 405-*b* after a handover of the UE 415 from the first cell (e.g., served by the network entity 405-*a*) to the second cell (e.g., served by the network entity 405-*b*). The handover command may be an example of a handover command illustrated by and described with reference to FIG. 3. For example, the handover command may trigger the handover of the UE from the first cell to the second cell. The UE 415 may receive the resource allocation information and the handover command via L1 signaling (e.g., via DCI) or via L2 signaling (e.g., via a MAC-CE). That is, the cell switch command may be a MAC-CE or DCI. In some examples, the cell switch command message may indicate the resource allocation (e.g., one or more time-frequency resources) and one or more other configurations (e.g., a TCI state, a timing advance value, one or more power control parameters) for transmission of the initial uplink message. That is, the cell switch command message transmitted at 420 may include the handover command (e.g., to trigger the handover), the resource allocation information (e.g., indicating the resource allocation for transmission of the initial uplink message after the handover), and an indication of one or more parameters to use for transmission of the initial uplink message after the handover. The one or more parameters may be an example of one or more parameters as described with reference to FIG. 3.

In some examples, at 425, the UE 415 may handover from the first cell to the second cell. The handover may be an example of a handover illustrated by and described with reference to FIG. 3. For example, the handover may correspond to a handover event in which communications at the UE 415 switching from the first cell to the second cell. The handover may be an intra-DU handover. For example, the first cell (e.g., an old serving cell, the source cell), and the second cell (e.g., a new serving cell, the target cell) may be associated with a same DU. In such examples, the DU may determine (e.g., dynamically, such as based on one or more available resources associated with the second cell) the resource allocation for transmission of the initial uplink message at the UE 415.

At 430, the UE 415 may transmit the initial uplink message to the network entity 405-*b* via the second cell. In some examples, the UE 415 may transmit the initial uplink message in response to the handover command (e.g., received via the cell switch command message at 420) and in accordance with the resource allocation. The initial uplink message may be an example of an initial uplink message illustrated by and described with reference to FIG. 3. For example, the initial uplink message may identify the UE 415 to the network entity 405-*b* (e.g., may indicate an arrival of the UE 415 on the second cell). In some examples, the initial uplink message may include identity information that identifies the UE 415. The identity information may be an example of identity information described with reference to FIG. 3. For example, the identity information may correspond to an RNTI (e.g., a C-RNTI, a MCS-C-RNTI), one or more resources included in the resource allocation, a sequence or scrambling identifier, or a random access preamble. The first uplink transmission after the handover may be a PUSCH, an SRS, a PUCCH, or a PRACH. In some examples, the identity information may depend on the type of uplink transmission used for the initial uplink message (e.g., whether the first uplink transmission is a PUSCH, an SRS, a PUCCH, or a PRACH). For example, the UE 415 may transmit a PUSCH as the initial uplink message and the identity information may be a C-RNTI (e.g., a C-RNTI MAC-CE) or associated with a resource used for the PUSCH transmission (e.g., a resource included in the resource allocation). In some other examples, the UE 415 may transmit a PUCCH or an SRS as the initial uplink message and the identity information may be indicated by a sequence or scrambling identifier associated with the PUCCH transmission or the SRS. In some examples, the UE 415 may transmit a PRACH transmission as the initial uplink message and the identity information may be a dedicated preamble associated with the PRACH transmission. In some examples, determining (e.g., selecting) the identity information base on the type of uplink transmission used for the initial uplink transmission after the handover may lead to more efficient utilization of communication resources, among other benefits.

Figure 5:
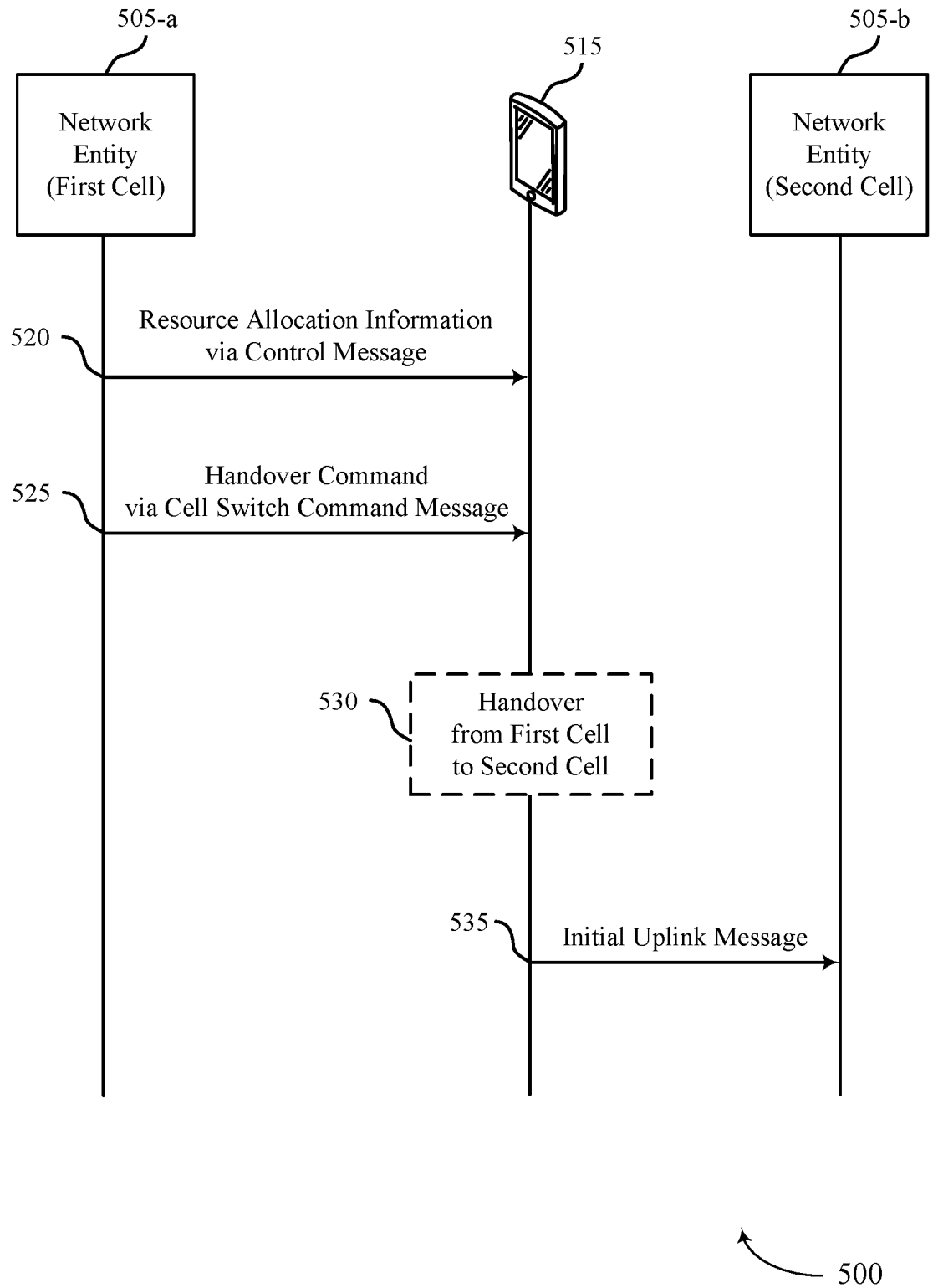

FIG. 5 shows an example of a process flow 500 that supports techniques for configuring an initial uplink transmission after a cell switch in accordance with one or more aspects of the present disclosure. In some examples, the process flow 500 may implement one or more aspects of wireless communications system 100, the network architecture 200, the wireless communications system 300, and the process flow 400. For example, the process flow 500 may include example operations associated a network entity 505-*a*, a network entity 505-*b*, and a UE 515, which may be examples of the corresponding devices illustrated by and described with reference to FIGS. 1 through 4. The operations performed by the network entity 505-*a*, the network entity 505-*b*, and the UE 515 may support improvements to communications between the UE 515 and the network entities 505, among other benefits. In the following description of the process flow 500, the operations between the UE 515 and the network entities 505 may occur in a different order than the example order shown. Additionally, or alternatively, the operations performed by the UE 515 and the network entities 505 may be performed in different orders or at different times. Some operations may also be omitted or combined. In the example of FIG. 5, the network entity 505-*a* may serve a first cell and the network entity 505-*b* may serve a second cell. That is, operations associated the network entity 505-*a* (e.g., transmissions from the network entity 505-*a* or receptions at the network entity 505-*a*) may occur via the first cell and operations associated the network entity 505-*b* (e.g., transmissions from the network entity 505-*b* or receptions at the network entity 505-*b*) may occur via the second cell.

The UE 515 and the network entities 505 may support a framework for scheduling resources for transmission of initial uplink messages after handover events. For example, in accordance with one or more techniques for configuring an initial uplink transmission after a cell switch, as described herein, the network entity 505-*a* may configure the UE 515 with resources for transmission of an initial uplink message after a cell switch at the UE 515 from the first cell to the second cell (e.g., after communications at the UE 515 are handed over from the first cell to the second cell). The first cell may be an example of a source cell (e.g., a serving cell) illustrated by and described with reference to FIGS. 3 and 4. Additionally, or alternatively, the second cell may be an example of a target cell (e.g., a non-serving cell) illustrated by and described with reference to FIGS. 3 and 4.

At 520, the UE 515 may receive resource allocation information via a control message. For example, the network entity 505-*a* may transmit a control message to the UE 515 via the first cell that includes the resource allocation information. The resource allocation information may be an example of resource allocation information illustrated by and described with reference to FIGS. 3 and 4. For example, the network entity 505-*a* may use the resource allocation information included in the control message to configure the UE 515 with one or more resource allocations for transmission of initial uplink messages after cell handovers. In such an example, the network entity 505-*a* may use a cell switch command message to activate one or more of the configured resource allocations for transmission of the initial uplink message after the handover of the UE 515 from the first cell to the second cell.

At 525, the UE 515 may receive a handover command via the cell switch command message. The handover command may be an example of a handover command illustrated by and described with reference to FIGS. 3 and 4. For example, the handover command may trigger the handover of the UE 515 from the first cell to the second cell.

In some examples, the resource allocation information (e.g., included in the control message transmitted at 520) may configures multiple resource allocations for transmission of initial uplink messages after cell handovers. For example, the resource allocation information may indicate multiple resource allocations (e.g., uplink transmission configurations) for transmission of initial uplink messages after cell handovers. In such examples, the cell switch command message transmitted at 525 may indicate (e.g., configure) a resource allocation of the multiple resource allocations (e.g., one of the multiple configuration). That is, the multiple resource allocations (e.g., the uplink transmission configurations) may be configured by the resource allocation information (e.g., preconfigured in RRC) and the cell switch command message may activate one of the multiple resource allocations (e.g., one of the preconfigurations). For example, the cell switch command message may indicate (e.g., configure) a resource allocation to activate for the first uplink transmission on the second cell (e.g., after the handover). In other words, the cell switch command message may include an indication to activate the resource allocation for transmission of the initial uplink message after the handover. The multiple resource allocations (e.g., the uplink transmission configurations) may be periodic or semi-persistent. That is, a resource allocation (e.g., each of the multiple resource allocations) may include a respective set of periodic or semi-persistent resources. In some examples, the UE 515 may use the resource allocation (e.g., the set of periodic or semi-persistent resources) to transmit multiple initial uplink messages. For example, the UE 515 may transmit the initial uplink message for one or more transmission occasions (e.g., for each transmission occasion) scheduled via the resource allocation. In other words, the UE 515 may repeat the first uplink transmission during scheduled transmission occasions (e.g., until the UE 515 receives a response message from the network entity 505-*b*). In some examples, the handover triggered via the handover command may be an intra-DU handover. For example, the first cell and the second cell may be associated with a same DU, and the DU may determine the resource allocation activated via the cell switch command for transmission of the initial uplink message after the handover from the first cell to the second cell. The resource allocation may be based on resource scheduling (e.g., available resources) associated with the second cell.

In some other examples, the resource allocation information (e.g., included in the control message transmitted at 520) may configures a resource allocation (e.g., a single resource allocation) for transmission of initial uplink messages after cell handovers. For example, the resource allocation information may indicate a resource allocation (e.g., an uplink transmission configuration) for transmission of initial uplink messages after cell handovers. In such an example, reception of the cell switch command message at 525 may activate the resource allocation. In other words, the resource allocation (e.g., the uplink transmission configuration) may be configured by the resource allocation information (e.g., preconfigured in RRC) and autonomously activated by the cell switch command message. In some examples, the resource allocation may occur after a timing offset. The network entity 505-*a* may indicate a duration of the timing offset to the UE 515 (e.g., via the cell switch command message) or the UE 515 may be otherwise configured with the duration of the timing offset. That is, the resource allocation for the initial uplink message (e.g., the pre-configuration of the first uplink transmission after the handover) may occur (e.g., take effect) after a configured timing offset (e.g., a predefined duration) or after a timing offset indicated in the cell switch command message (e.g., a value of a timing offset, which may be similar to a PDSCH scheduling offset value indicated via a downlink grant). In some examples, the handover triggered via the handover command may be an intra-DU handover. That is, the first cell and the second cell may be associated with a same DU.

In some other examples, the handover may correspond to an inter-DU handover. That is, the first cell may be associated with a first DU (DU1) and the second cell may be associated with a second DU (DU2). In some examples, for inter-DU handovers, DU2 may provide the resource allocation (e.g., a single uplink transmission configuration) to a CU (e.g., associated with DU1 and DU2, a common CU), which may provide the resource allocation to DU1. That is, the second DU associated with the second cell may determine the resource allocation and indicate the resource allocation to the first DU via the CU. In such examples, the first DU may activate the indicated resource allocation at the UE 515. That is, the first DU may activate the indicated resource allocation at the UE 515 (e.g., via the cell switch command message) for transmission of the uplink message after the cell handover.

In some examples, at 530, the UE 515 may handover from the first cell to the second cell. The handover may be an example of a handover illustrated by and described with reference to FIGS. 3 and 4. For example, the handover may correspond to a handover event in which communications at the UE 515 switching from the first cell to the second cell. The handover may be an intra-DU handover. For example, the first cell (e.g., an old serving cell, the source cell), and the second cell (e.g., a new serving cell, the target cell) may be associated with a same DU. In such examples, the DU may determine (e.g., dynamically, such as based on one or more available resources associated with the second cell) the resource allocation for transmission of the initial uplink message at the UE 515.

At 535, the UE 515 may transmit the initial uplink message to the network entity 505-*b* via the second cell. The UE 515 may transmit the initial uplink message in response to the handover command and in accordance with the resource allocation. The initial uplink message may be an example of an initial uplink message illustrated by and described with reference to FIGS. 3 and 4. For example, the initial uplink message may identify the UE 515 to the network entity 505-*b* (e.g., may indicate an arrival of the UE 515 on the second cell). In some examples, the initial uplink message may include identity information that identifies the UE 515. The identity information may be an example of identity information described with reference to FIGS. 3 and 4. For example, the identity information may correspond to an RNTI (e.g., a C-RNTI, a MCS-C-RNTI), one or more resources included in the resource allocation, a sequence, a scrambling identifier, or a preamble. The first uplink transmission after the handover may be a PUSCH (e.g., a configured grant PUSCH), an SRS (e.g., a periodic SRS or a semi-persistent SRS), a PUCCH (e.g., an SR), or a PRACH. In some examples, the identity information may depend on the type of uplink transmission used for the initial uplink message (e.g., whether the first uplink transmission is a PUSCH, an SRS, a PUCCH, or a PRACH). In some examples, the UE 515 may transmit the initial uplink message after the timing offset. For example, reception of the cell switch command message (e.g., at 525) may trigger the timing offset (e.g., a duration of the timing offset, which may be preconfigured or indicated in the cell switch command message) at the UE 515. In some examples, transmitting the initial uplink message in accordance with the timing offset may lead to improved utilization of processing capability at the UE 515, among other benefits.

Figure 6:
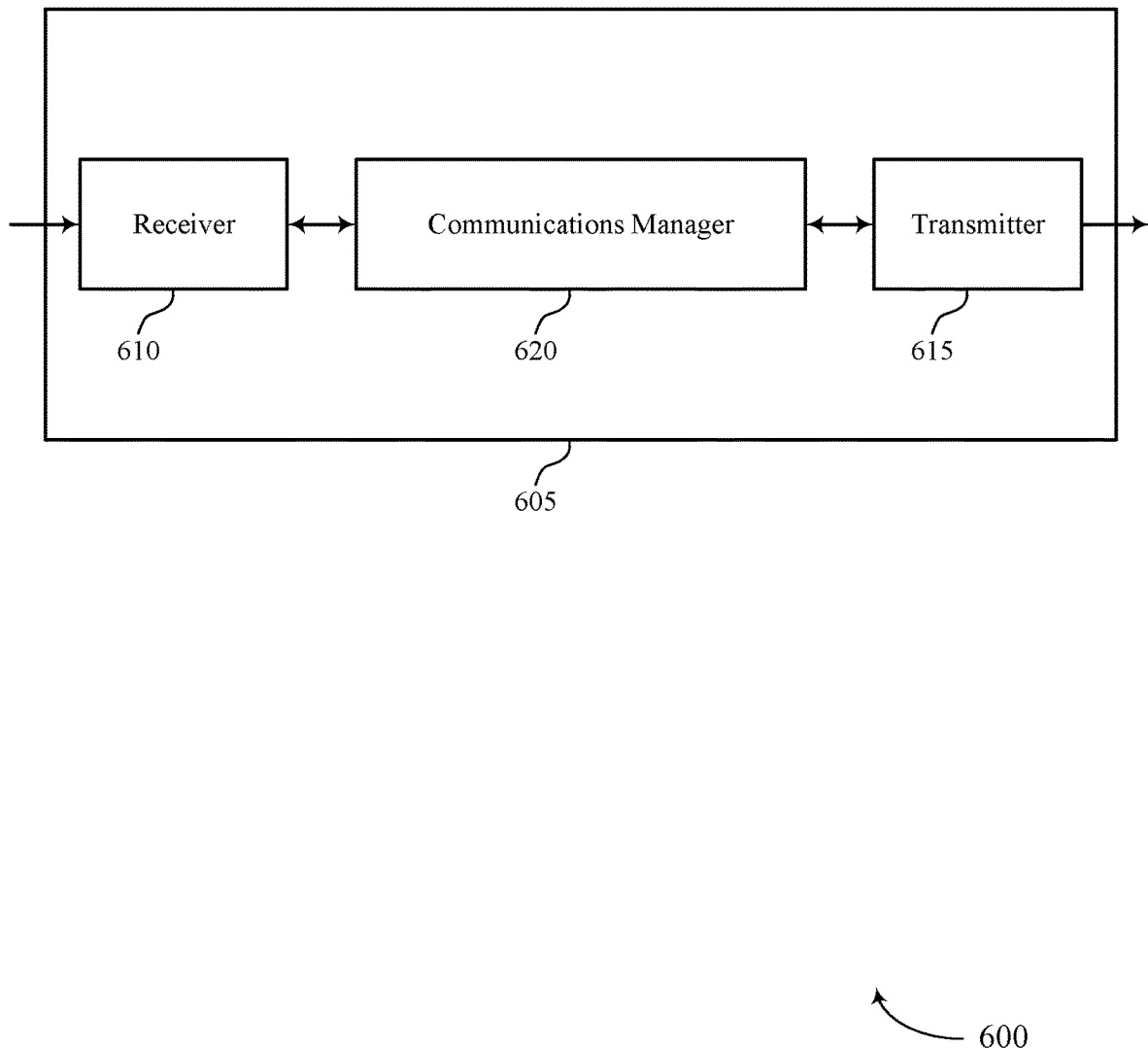
FIGS. 6 and 7 show block diagrams of devices that support techniques for configuring an initial uplink transmission after a cell switch in accordance with one or more aspects of the present disclosure.

FIG. 6 shows a block diagram 600 of a device 605 that supports techniques for configuring an initial uplink transmission after a cell switch in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for configuring an initial uplink transmission after a cell switch). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for configuring an initial uplink transmission after a cell switch). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for configuring an initial uplink transmission after a cell switch as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network node (e.g., the device 605) in accordance with examples as disclosed herein. For example, the communications manager 620 is capable of, configured to, or operable to support a means for receiving, via a first cell, information that indicates a resource allocation for transmission, via a second cell, of an initial uplink message, where the initial uplink message is a first uplink transmission scheduled to occur between the first network node and a second network node after a handover of the first network node from the first cell to the second cell. The communications manager 620 is capable of, configured to, or operable to support a means for receiving, via the first cell, a command that triggers the handover of the first network node from the first cell to the second cell. The communications manager 620 is capable of, configured to, or operable to support a means for transmitting, via the second cell, the initial uplink message in response to the command and in accordance with the resource allocation.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
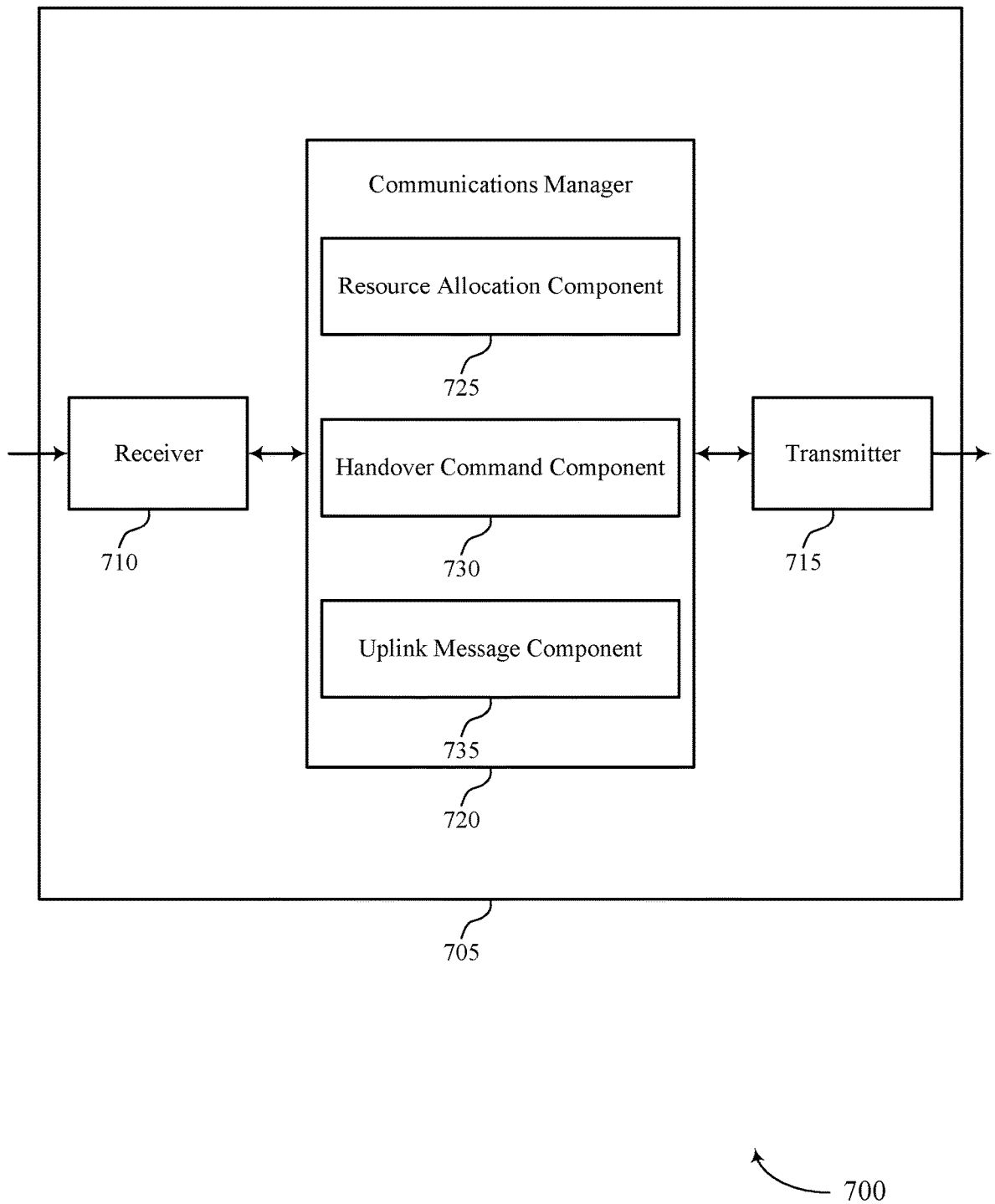

FIG. 7 shows a block diagram 700 of a device 705 that supports techniques for configuring an initial uplink transmission after a cell switch in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for configuring an initial uplink transmission after a cell switch). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for configuring an initial uplink transmission after a cell switch). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for configuring an initial uplink transmission after a cell switch as described herein. For example, the communications manager 720 may include a resource allocation component 725, a handover command component 730, an uplink message component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first network node (e.g., the device 705) in accordance with examples as disclosed herein. The resource allocation component 725 is capable of, configured to, or operable to support a means for receiving, via a first cell, information that indicates a resource allocation for transmission, via a second cell, of an initial uplink message, where the initial uplink message is a first uplink transmission scheduled to occur between the first network node and a second network node after a handover of the first network node from the first cell to the second cell. The handover command component 730 is capable of, configured to, or operable to support a means for receiving, via the first cell, a command that triggers the handover of the first network node from the first cell to the second cell. The uplink message component 735 is capable of, configured to, or operable to support a means for transmitting, via the second cell, the initial uplink message in response to the command and in accordance with the resource allocation.

Figure 8:
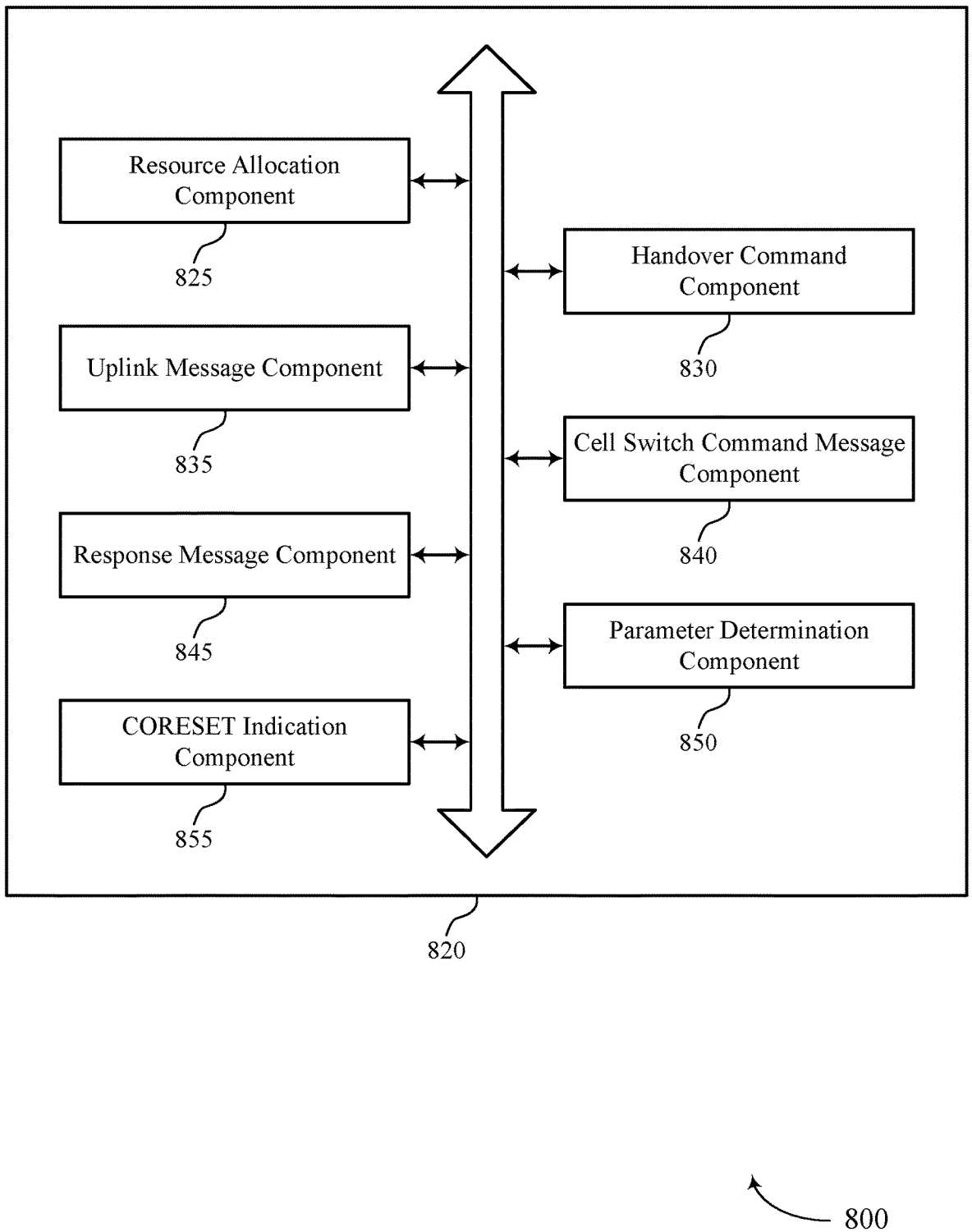
FIG. 8 shows a block diagram of a communications manager that supports techniques for configuring an initial uplink transmission after a cell switch in accordance with one or more aspects of the present disclosure.

FIG. 8 shows a block diagram 800 of a communications manager 820 that supports techniques for configuring an initial uplink transmission after a cell switch in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for configuring an initial uplink transmission after a cell switch as described herein. For example, the communications manager 820 may include a resource allocation component 825, a handover command component 830, an uplink message component 835, a cell switch command message component 840, a response message component 845, a parameter determination component 850, a CORESET indication component 855, or any combination thereof. Each of these components may communicate, directly or indirectly, with one another (e.g., via one or more buses).

The communications manager 820 may support wireless communication at a first network node (e.g., a UE) in accordance with examples as disclosed herein. The resource allocation component 825 is capable of, configured to, or operable to support a means for receiving, via a first cell, information that indicates a resource allocation for transmission, via a second cell, of an initial uplink message, where the initial uplink message is a first uplink transmission scheduled to occur between the first network node and a second network node (e.g., a network entity) after a handover of the first network node from the first cell to the second cell. The handover command component 830 is capable of, configured to, or operable to support a means for receiving, via the first cell, a command that triggers the handover of the first network node from the first cell to the second cell. The uplink message component 835 is capable of, configured to, or operable to support a means for transmitting, via the second cell, the initial uplink message in response to the command and in accordance with the resource allocation.

In some examples, to support receiving the information, the cell switch command message component 840 is capable of, configured to, or operable to support a means for receiving a cell switch command message that includes both the information and the command. In some examples, the initial uplink message is one of a PUSCH transmission, an SRS, a PUCCH transmission, or a PRACH transmission.

In some examples, to support receiving the information, the resource allocation component 825 is capable of, configured to, or operable to support a means for receiving, via the first cell, a control message that indicates one or more resource allocations for transmission of initial uplink messages after cell handovers, where the one or more resource allocations includes at least the resource allocation.

In some examples, to support receiving the command, the cell switch command message component 840 is capable of, configured to, or operable to support a means for receiving a cell switch command message that includes the command and an indication to activate the resource allocation for transmission of the initial uplink message after the handover. In some examples, the resource allocation includes a respective set of periodic or semi-persistent resources. In some examples, the initial uplink message is one of a configured grant PUSCH transmission, an SR, a periodic or semi-persistent SRS, or a PRACH transmission.

In some examples, to support receiving the command, the cell switch command message component 840 is capable of, configured to, or operable to support a means for receiving a cell switch command message that includes the command, where reception of the cell switch command message activates the resource allocation for transmission of the initial uplink message.

In some examples, to support transmitting the initial uplink message, the uplink message component 835 is capable of, configured to, or operable to support a means for transmitting the initial uplink message after a timing offset, where reception of the cell switch command message triggers the timing offset, and where a duration of the timing offset is preconfigured or is indicated in the cell switch command message.

In some examples, the first cell is associated with a first DU and the second cell is associated with the first DU or a second DU different from the first DU. In some examples, the initial uplink message includes identity information that identifies the first network node. In some examples, to support transmitting the initial uplink message, the uplink message component 835 is capable of, configured to, or operable to support a means for transmitting a PUSCH transmission as the initial uplink message, where the identity information is a C-RNTI included in the PUSCH transmission.

In some examples, to support transmitting the initial uplink message, the uplink message component 835 is capable of, configured to, or operable to support a means for transmitting a PUSCH transmission as the initial uplink message, where the identity information is associated with a resource used for the PUSCH transmission.

In some examples, to support transmitting the initial uplink message, the uplink message component 835 is capable of, configured to, or operable to support a means for transmitting a PUCCH transmission or an SRS as the initial uplink message, where the identity information is indicated by a sequence or scrambling identifier associated with the PUCCH transmission or the SRS.

In some examples, to support transmitting the initial uplink message, the uplink message component 835 is capable of, configured to, or operable to support a means for transmitting a PRACH transmission as the initial uplink message, where the identity information is a dedicated preamble associated with the PRACH transmission.

In some examples, the response message component 845 is capable of, configured to, or operable to support a means for receiving, via the second cell, a response message responsive to the initial uplink message. In some examples, the response message includes a RAR message when the initial uplink message is a PRACH transmission.

In some examples, the response message includes a physical downlink control channel transmission that includes a CRC that is scrambled with an identifier of the first network node. In some examples, the identifier is a C-RNTI associated with the second cell.

In some examples, the CORESET indication component 855 is capable of, configured to, or operable to support a means for receiving, via the first cell, an indication of a CORESET associated with the second cell. In some examples, the response message component 845 is capable of, configured to, or operable to support a means for monitoring the CORESET for the response message after transmission of the initial uplink message, where the CORESET is monitored in accordance with a TCI state associated with the second cell.

In some examples, the parameter determination component 850 is capable of, configured to, or operable to support a means for determining, via the first cell, one or more parameters associated with the second cell, where transmission of the initial uplink message is in accordance with at least one parameter of the one or more parameters.

In some examples, to support determining the one or more parameters, the cell switch command message component 840 is capable of, configured to, or operable to support a means for receiving a cell switch command message that includes the command and an indication of the one or more parameters.

In some examples, to support determining the one or more parameters, the parameter determination component 850 is capable of, configured to, or operable to support a means for determining the one or more parameters via a rule or from one or more preconfigured values. In some examples, the one or more parameters include one or more TCI states, one or more timing advance values, or one or more power control parameters.

Figure 9:
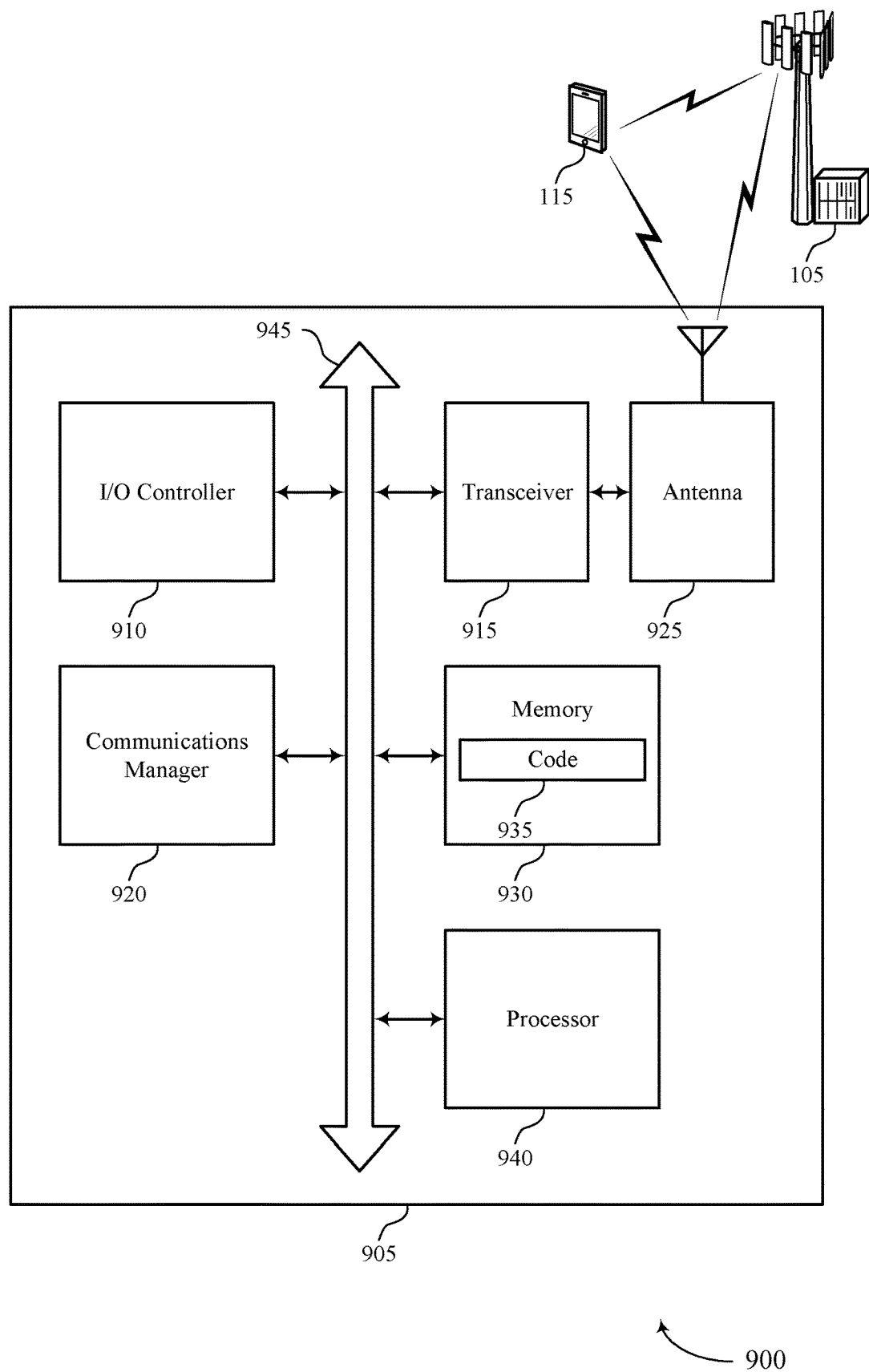
FIG. 9 shows a diagram of a system including a device that supports techniques for configuring an initial uplink transmission after a cell switch in accordance with one or more aspects of the present disclosure.

FIG. 9 shows a diagram of a system 900 including a device 905 that supports techniques for configuring an initial uplink transmission after a cell switch in accordance with one or more aspects of the present disclosure. The device 905 may be an example of or include the components of a device 605, a device 705, or a UE 115 as described herein. The device 905 may communicate (e.g., the wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for configuring an initial uplink transmission after a cell switch). For example, the device 905 or a component of the device 905 may include a processor 940 and memory 930 coupled with or to the processor 940, the processor 940 and memory 930 configured to perform various functions described herein.

The communications manager 920 may support wireless communication at a first network node (e.g., the device 905) in accordance with examples as disclosed herein. For example, the communications manager 920 is capable of, configured to, or operable to support a means for receiving, via a first cell, information that indicates a resource allocation for transmission, via a second cell, of an initial uplink message, where the initial uplink message is a first uplink transmission scheduled to occur between the first network node and a second network node after a handover of the first network node from the first cell to the second cell. The communications manager 920 is capable of, configured to, or operable to support a means for receiving, via the first cell, a command that triggers the handover of the first network node from the first cell to the second cell. The communications manager 920 is capable of, configured to, or operable to support a means for transmitting, via the second cell, the initial uplink message in response to the command and in accordance with the resource allocation.

By including or configuring the communications manager 920 in accordance with examples as described herein, the device 905 may support techniques for communication reliability, reduced latency, more efficient utilization of communication resources, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for configuring an initial uplink transmission after a cell switch as described herein, or the processor 940 and the memory 930 may be otherwise configured to perform or support such operations.

Figure 10:
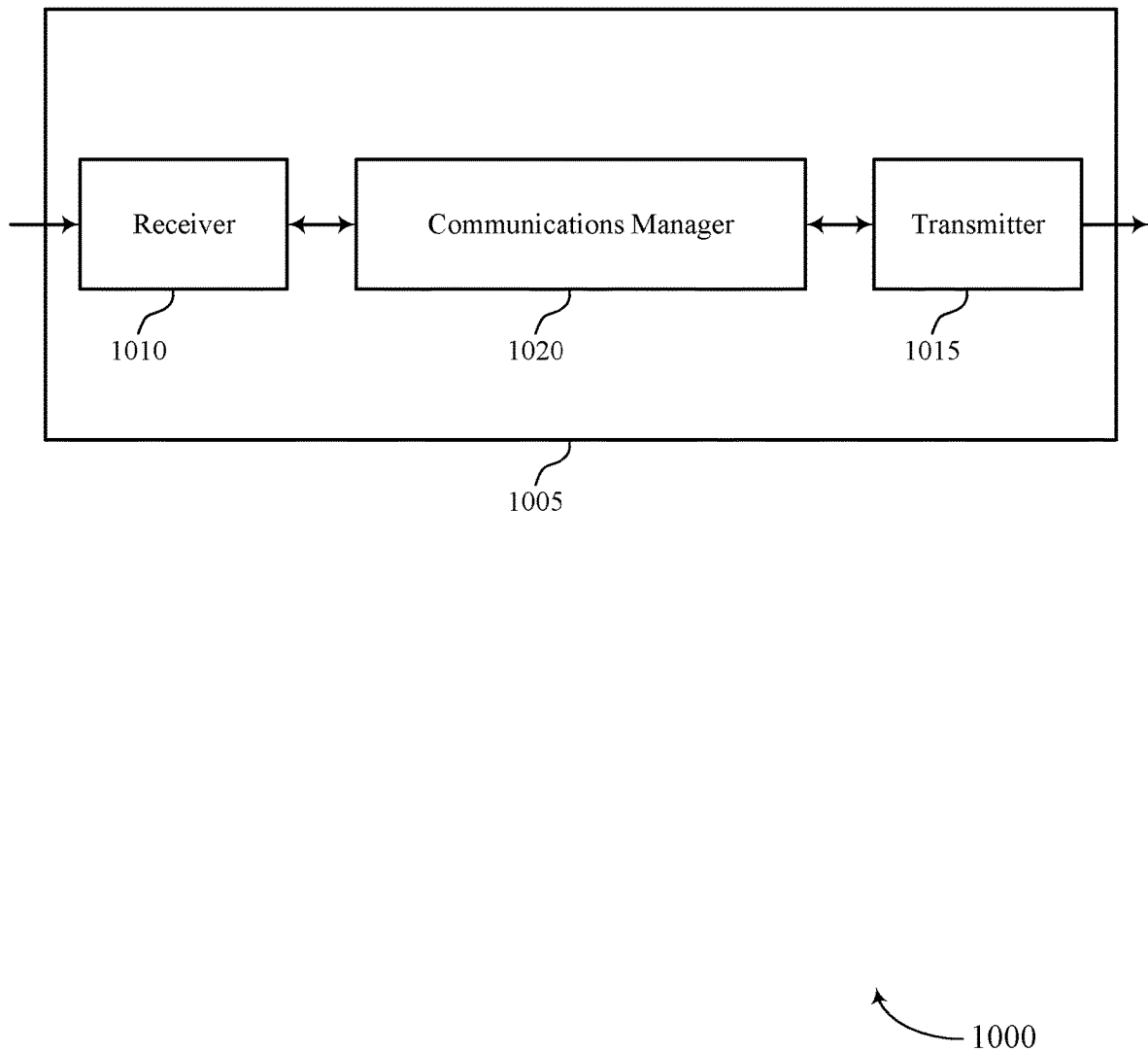
FIGS. 10 and 11 show block diagrams of devices that support techniques for configuring an initial uplink transmission after a cell switch in accordance with one or more aspects of the present disclosure.

FIG. 10 shows a block diagram 1000 of a device 1005 that supports techniques for configuring an initial uplink transmission after a cell switch in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for configuring an initial uplink transmission after a cell switch as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first network node (e.g., the device 1005) in accordance with examples as disclosed herein. For example, the communications manager 1020 is capable of, configured to, or operable to support a means for outputting, via a first cell, information that indicating a resource allocation for transmission, via a second cell, of an initial uplink message by a second network node, where the initial uplink message is a first uplink transmission scheduled to occur between the second network node and a third network node after a handover of the second network node from the first cell to the second cell. The communications manager 1020 is capable of, configured to, or operable to support a means for outputting, via the first cell, a command that triggering the handover of the second network node from the first cell to the second cell.

Additionally, or alternatively, the communications manager 1020 may support wireless communication at a first network node (e.g., the device 1005) in accordance with examples as disclosed herein. For example, the communications manager 1020 is capable of, configured to, or operable to support a means for obtaining an initial uplink message via a first cell and from a second network node, where the initial uplink message is a first uplink transmission scheduled to occur between the second network node and the first network node after a handover of the second network node from a second cell to the first cell, where the initial uplink message is different from a random access message and includes identity information that identifies the second network node. The communications manager 1020 is capable of, configured to, or operable to support a means for outputting, via the first cell, a response message that being associated with the second network node via the identity information.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
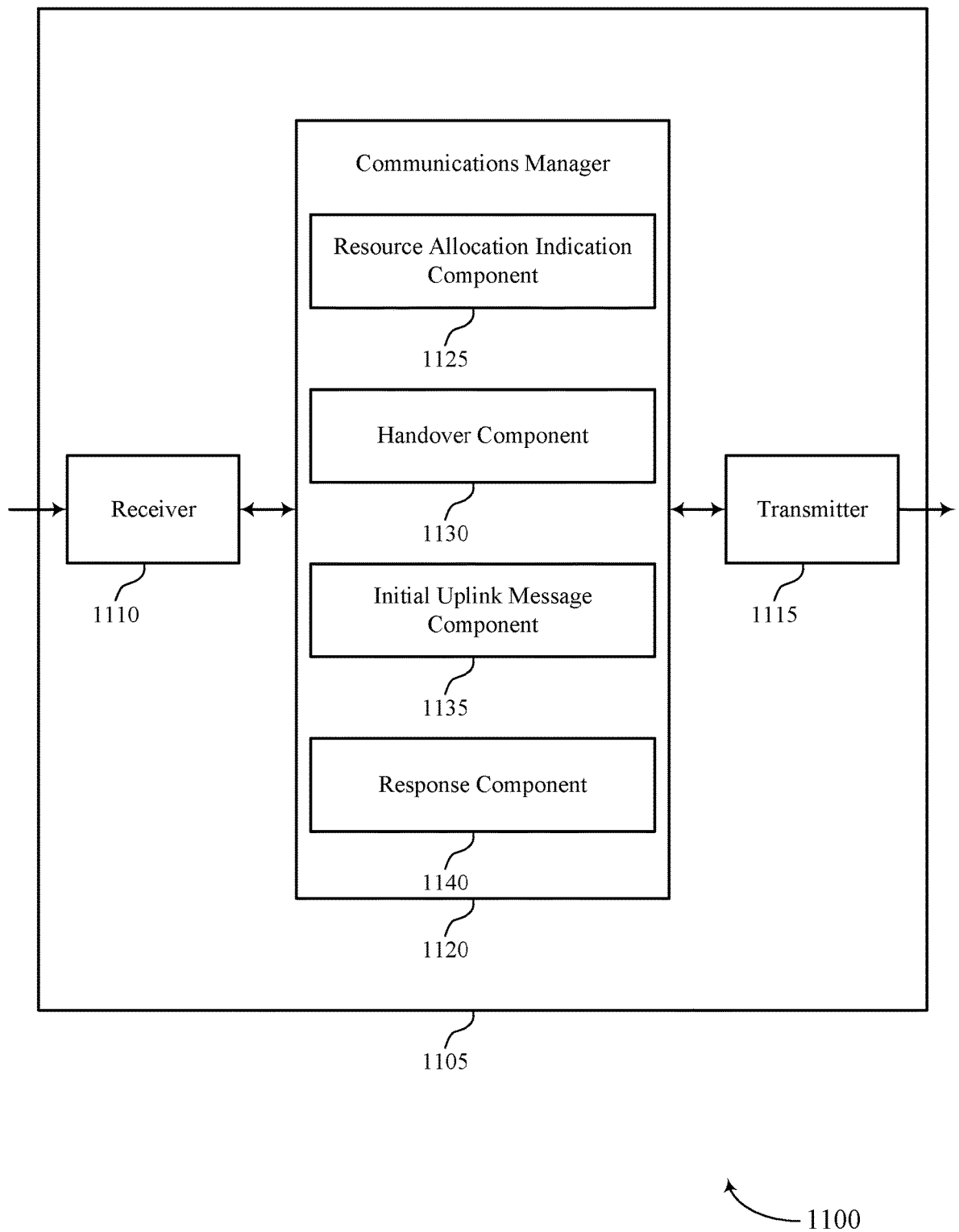

FIG. 11 shows a block diagram 1100 of a device 1105 that supports techniques for configuring an initial uplink transmission after a cell switch in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for configuring an initial uplink transmission after a cell switch as described herein. For example, the communications manager 1120 may include a resource allocation indication component 1125, a handover component 1130, an initial uplink message component 1135, a response component 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a first network node (e.g., the device 1105) in accordance with examples as disclosed herein. The resource allocation indication component 1125 is capable of, configured to, or operable to support a means for outputting, via a first cell, information that indicates a resource allocation for transmission, via a second cell, of an initial uplink message by a second network node, where the initial uplink message is a first uplink transmission scheduled to occur between the second network node and a third network node after a handover of the second network node from the first cell to the second cell. The handover component 1130 is capable of, configured to, or operable to support a means for outputting, via the first cell, a command that triggers the handover of the second network node from the first cell to the second cell.

Additionally, or alternatively, the communications manager 1120 may support wireless communication at a first network node (e.g., the device 1105) in accordance with examples as disclosed herein. The initial uplink message component 1135 is capable of, configured to, or operable to support a means for obtaining an initial uplink message via a first cell and from a second network node, where the initial uplink message is a first uplink transmission scheduled to occur between the second network node and the first network node after a handover of the second network node from a second cell to the first cell, where the initial uplink message is different from a random access message and includes identity information that identifies the second network node. The response component 1140 is capable of, configured to, or operable to support a means for outputting, via the first cell, a response message that is associated with the second network node via the identity information.

Figure 12:
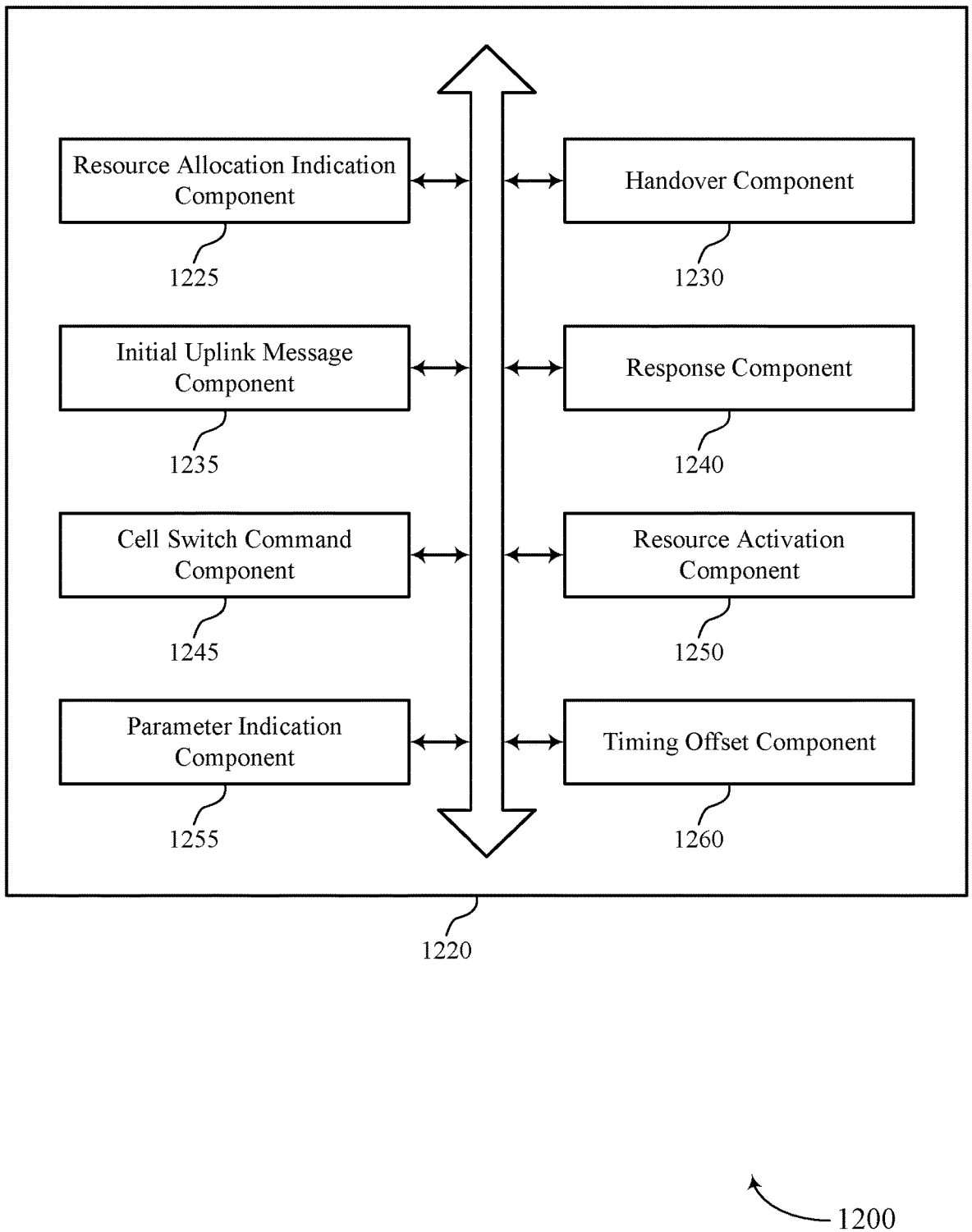
FIG. 12 shows a block diagram of a communications manager that supports techniques for configuring an initial uplink transmission after a cell switch in accordance with one or more aspects of the present disclosure.

FIG. 12 shows a block diagram 1200 of a communications manager 1220 that supports techniques for configuring an initial uplink transmission after a cell switch in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for configuring an initial uplink transmission after a cell switch as described herein. For example, the communications manager 1220 may include a resource allocation indication component 1225, a handover component 1230, an initial uplink message component 1235, a response component 1240, a cell switch command component 1245, a resource activation component 1250, a parameter indication component 1255, a timing offset component 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a first network node in accordance with examples as disclosed herein. The resource allocation indication component 1225 is capable of, configured to, or operable to support a means for outputting, via a first cell, information that indicates a resource allocation for transmission, via a second cell, of an initial uplink message by a second network node, where the initial uplink message is a first uplink transmission scheduled to occur between the second network node and a third network node after a handover of the second network node from the first cell to the second cell. The handover component 1230 is capable of, configured to, or operable to support a means for outputting, via the first cell, a command that triggers the handover of the second network node from the first cell to the second cell.

In some examples, to support outputting the information, the cell switch command component 1245 is capable of, configured to, or operable to support a means for outputting a cell switch command message that includes both the information and the command. In some examples, the initial uplink message is one of a PUSCH transmission, an SRS, a PUCCH transmission, or a PRACH transmission.

In some examples, to support outputting the information, the resource allocation indication component 1225 is capable of, configured to, or operable to support a means for outputting, via the first cell, a control message that indicates one or more resource allocations for transmission of initial uplink messages after cell handovers, where the one or more resource allocations includes at least the resource allocation.

In some examples, to support outputting the command, the resource activation component 1250 is capable of, configured to, or operable to support a means for outputting a cell switch command message that includes the command and an indication to activate the resource allocation for transmission of the initial uplink message after the handover.

In some examples, the resource allocation includes a respective set of periodic or semi-persistent resources. In some examples, the initial uplink message is one of a configured grant PUSCH transmission, an SR, a periodic or semi-persistent SRS, or a PRACH transmission.

In some examples, to support outputting the command, the resource activation component 1250 is capable of, configured to, or operable to support a means for outputting a cell switch command message that includes the command, where reception of the cell switch command message activates the resource allocation for transmission of the initial uplink message.

In some examples, the first cell is associated with a first DU and the second cell is associated with the first DU or a second DU different from the first DU. In some examples, the second cell is associated with the second DU. In some examples, the resource allocation is determined at the second DU.

In some examples, the parameter indication component 1255 is capable of, configured to, or operable to support a means for outputting a cell switch command message that includes the command and an indication of one or more parameters associated with the second cell. In some examples, the one or more parameters include one or more TCI states, one or more timing advance values, or one or more power control parameters.

Additionally, or alternatively, the communications manager 1220 may support wireless communication at a first network node in accordance with examples as disclosed herein. The initial uplink message component 1235 is capable of, configured to, or operable to support a means for obtaining an initial uplink message via a first cell and from a second network node, where the initial uplink message is a first uplink transmission scheduled to occur between the second network node and the first network node after a handover of the second network node from a second cell to the first cell, where the initial uplink message is different from a random access message and includes identity information that identifies the second network node. The response component 1240 is capable of, configured to, or operable to support a means for outputting, via the first cell, a response message that is associated with the second network node via the identity information.

In some examples, to support obtaining the initial uplink message, the timing offset component 1260 is capable of, configured to, or operable to support a means for obtaining the initial uplink message after a timing offset.

In some examples, to support obtaining the initial uplink message, the initial uplink message component 1235 is capable of, configured to, or operable to support a means for obtaining a PUSCH transmission as the initial uplink message, where the identity information is a C-RNTI included in the PUSCH transmission.

In some examples, to support obtaining the initial uplink message, the initial uplink message component 1235 is capable of, configured to, or operable to support a means for obtaining a PUSCH transmission as the initial uplink message, where the identity information is associated with a resource used for the PUSCH transmission.

In some examples, to support obtaining the initial uplink message, the initial uplink message component 1235 is capable of, configured to, or operable to support a means for obtaining a PUCCH transmission or an SRS as the initial uplink message, where the identity information is indicated by a sequence or scrambling identifier associated with the PUCCH transmission or the SRS.

In some examples, to support obtaining the initial uplink message, the initial uplink message component 1235 is capable of, configured to, or operable to support a means for obtaining a PRACH transmission as the initial uplink message, where the identity information is a dedicated preamble associated with the PRACH transmission. In some examples, the first cell is associated with a first DU and the second cell is associated with the first DU or a second DU different from the first DU.

In some examples, to support obtaining the initial uplink message, the initial uplink message component 1235 is capable of, configured to, or operable to support a means for obtaining the initial uplink message in accordance with a resource allocation determined at the first DU.

In some examples, the resource allocation includes a respective set of periodic or semi-persistent resources. In some examples, the response message includes a physical downlink control channel transmission that includes a CRC that is scrambled with an identifier of the first network node. In some examples, the identifier is a C-RNTI associated with the second cell.

In some examples, to support obtaining the initial uplink message, the initial uplink message component 1235 is capable of, configured to, or operable to support a means for obtaining the initial uplink message in accordance with one or more parameters associated with the second cell, where the one or more parameters are based on the first cell.

In some examples, the one or more parameters include one or more TCI states, one or more timing advance values, or one or more power control parameters. In some examples, the initial uplink message is one of a PUSCH transmission, an SRS, a PUCCH transmission, or an SR.

Figure 13:
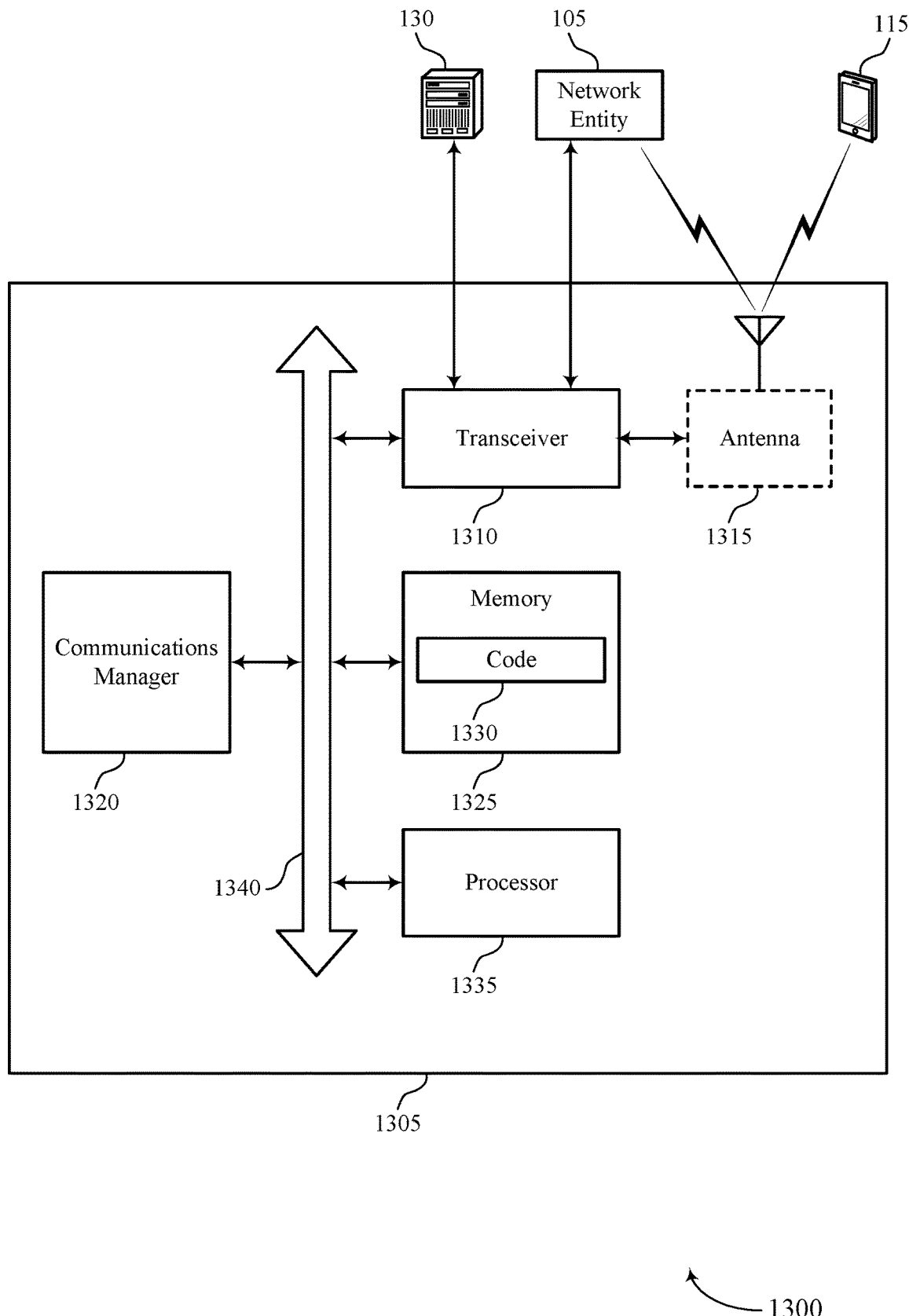
FIG. 13 shows a diagram of a system including a device that supports techniques for configuring an initial uplink transmission after a cell switch in accordance with one or more aspects of the present disclosure.

FIG. 13 shows a diagram of a system 1300 including a device 1305 that supports techniques for configuring an initial uplink transmission after a cell switch in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for configuring an initial uplink transmission after a cell switch). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a first network node in accordance with examples as disclosed herein. For example, the communications manager 1320 is capable of, configured to, or operable to support a means for outputting, via a first cell, information that indicating a resource allocation for transmission, via a second cell, of an initial uplink message by a second network node, where the initial uplink message is a first uplink transmission scheduled to occur between the second network node and a third network node after a handover of the second network node from the first cell to the second cell. The communications manager 1320 is capable of, configured to, or operable to support a means for outputting, via the first cell, a command that triggering the handover of the second network node from the first cell to the second cell.

Additionally, or alternatively, the communications manager 1320 may support wireless communication at a first network node in accordance with examples as disclosed herein. For example, the communications manager 1320 is capable of, configured to, or operable to support a means for obtaining an initial uplink message via a first cell and from a second network node, where the initial uplink message is a first uplink transmission scheduled to occur between the second network node and the first network node after a handover of the second network node from a second cell to the first cell, where the initial uplink message is different from a random access message and includes identity information that identifies the second network node. The communications manager 1320 is capable of, configured to, or operable to support a means for outputting, via the first cell, a response message that being associated with the second network node via the identity information.

By including or configuring the communications manager 1320 in accordance with examples as described herein, the device 1305 may support techniques for improved communication reliability, reduced latency, more efficient utilization of communication resources, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for configuring an initial uplink transmission after a cell switch as described herein, or the processor 1335 and the memory 1325 may be otherwise configured to perform or support such operations.

Figure 14:
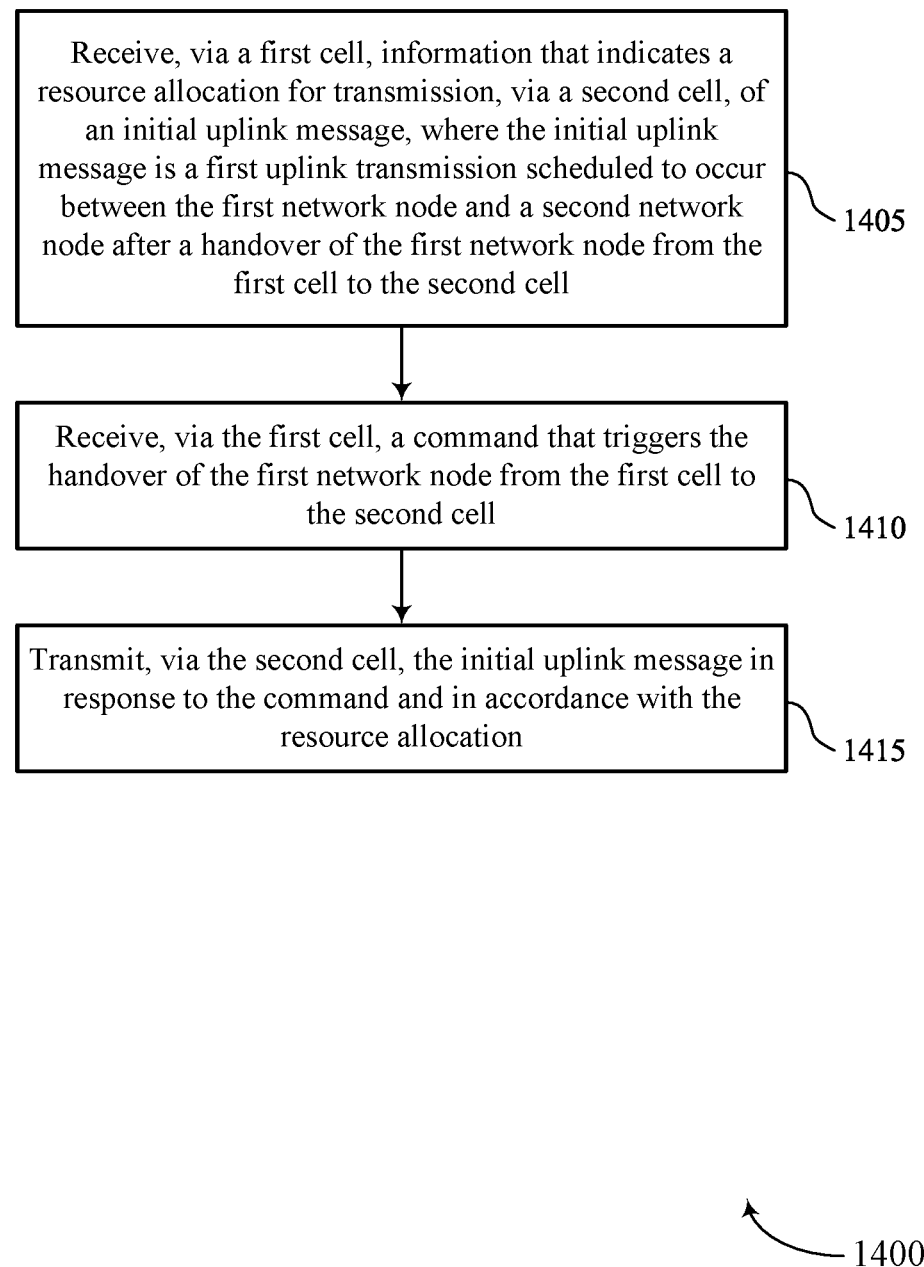
FIGS. 14 through 16 show flowcharts illustrating methods that support techniques for configuring an initial uplink transmission after a cell switch in accordance with one or more aspects of the present disclosure.

FIG. 14 shows a flowchart illustrating a method 1400 that supports techniques for configuring an initial uplink transmission after a cell switch in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving, via a first cell, information that indicates a resource allocation for transmission, via a second cell, of an initial uplink message, where the initial uplink message is a first uplink transmission scheduled to occur between the first network node and a second network node after a handover of the first network node from the first cell to the second cell. The operations of 1405 may be performed in accordance with examples as disclosed herein. In some examples, aspects of the operations of 1405 may be performed by a resource allocation component 825 as described with reference to FIG. 8.

At 1410, the method may include receiving, via the first cell, a command that triggers the handover of the first network node from the first cell to the second cell. The operations of 1410 may be performed in accordance with examples as disclosed herein. In some examples, aspects of the operations of 1410 may be performed by a handover command component 830 as described with reference to FIG. 8.

At 1415, the method may include transmitting, via the second cell, the initial uplink message in response to the command and in accordance with the resource allocation. The operations of 1415 may be performed in accordance with examples as disclosed herein. In some examples, aspects of the operations of 1415 may be performed by an uplink message component 835 as described with reference to FIG. 8.

Figure 15:
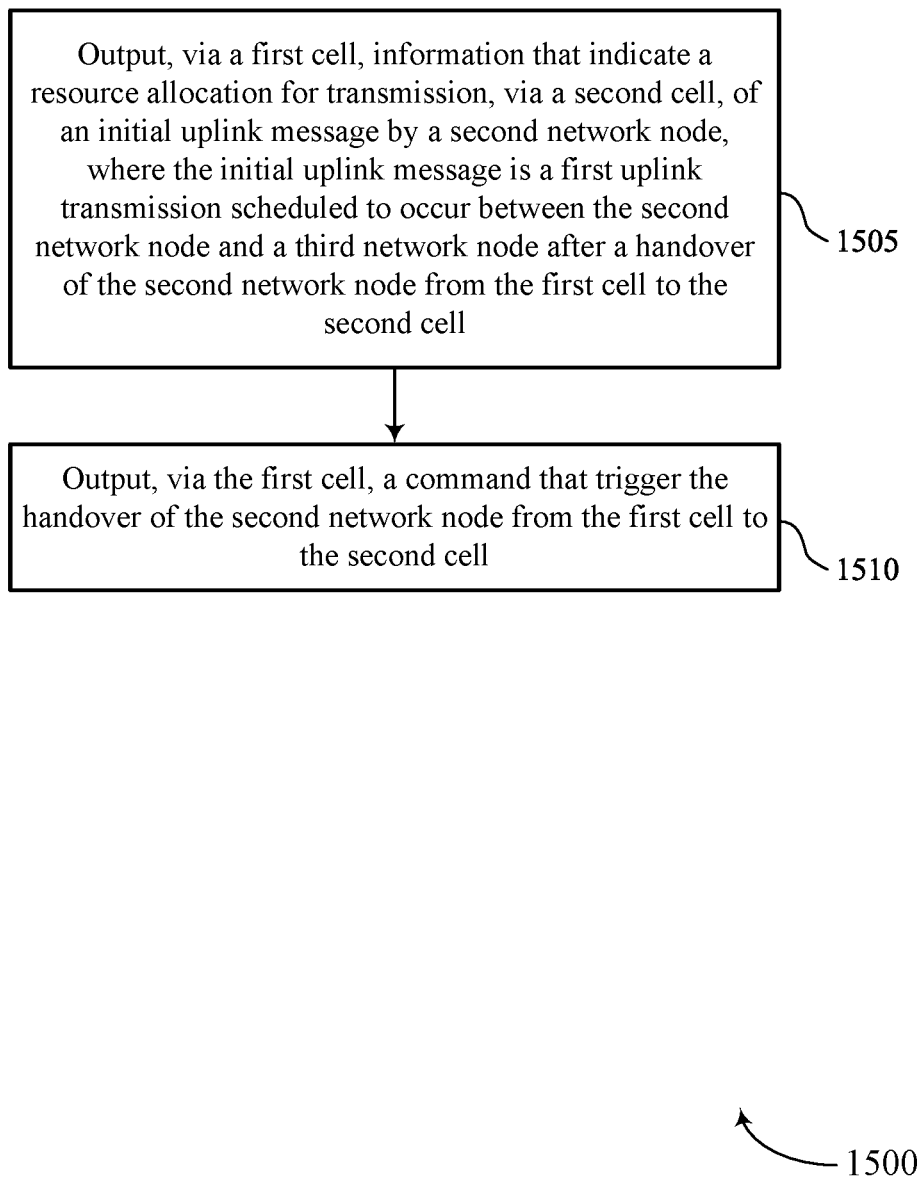

FIG. 15 shows a flowchart illustrating a method 1500 that supports techniques for configuring an initial uplink transmission after a cell switch in accordance with aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1505, the method may include outputting, via a first cell, information that indicates a resource allocation for transmission, via a second cell, of an initial uplink message by a second network node, where the initial uplink message is a first uplink transmission scheduled to occur between the second network node and a third network node after a handover of the second network node from the first cell to the second cell. The operations of 1505 may be performed in accordance with examples as disclosed herein. In some examples, aspects of the operations of 1505 may be performed by a resource allocation indication component 1225 as described with reference to FIG. 12.

At 1510, the method may include outputting, via the first cell, a command that triggers the handover of the second network node from the first cell to the second cell. The operations of 1510 may be performed in accordance with examples as disclosed herein. In some examples, aspects of the operations of 1510 may be performed by a handover component 1230 as described with reference to FIG. 12.

Figure 16:
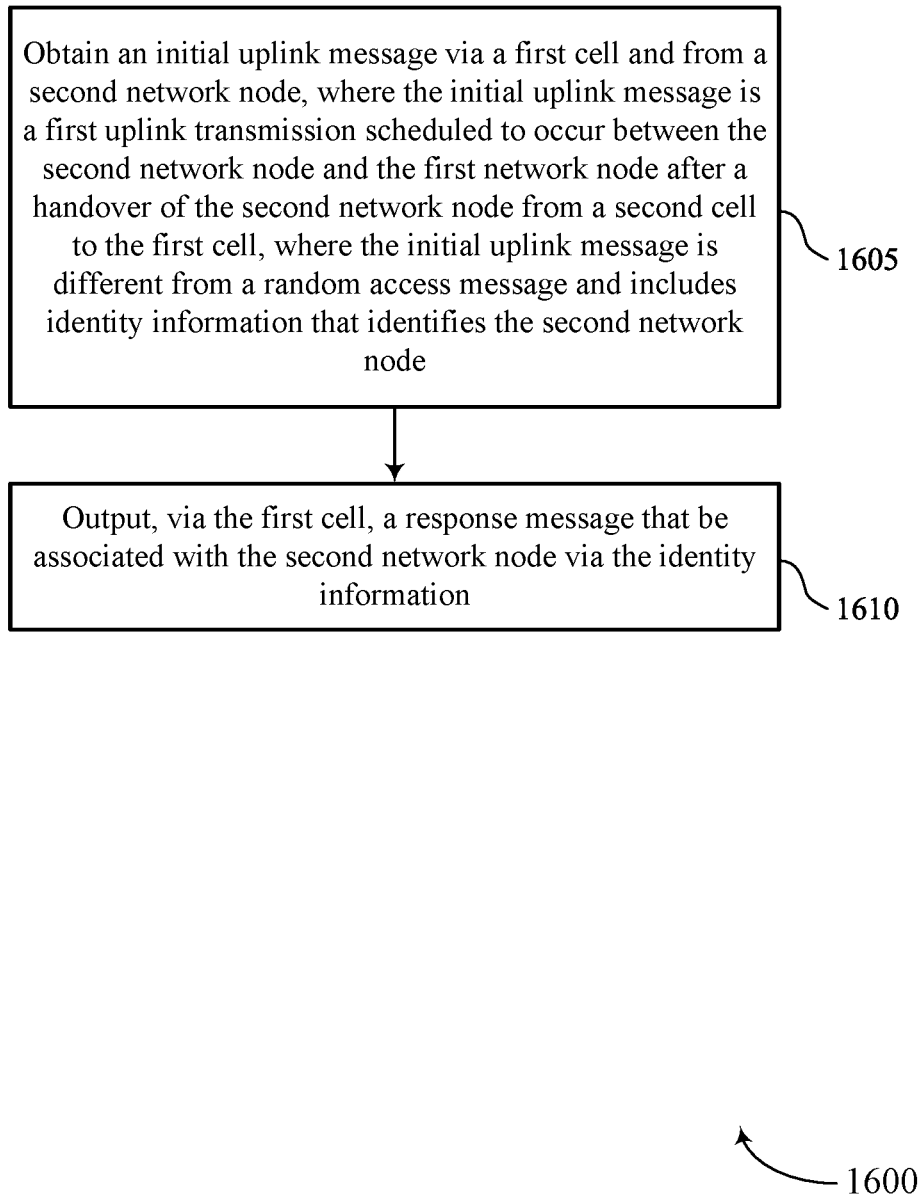

FIG. 16 shows a flowchart illustrating a method 1600 that supports techniques for configuring an initial uplink transmission after a cell switch in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include obtaining an initial uplink message via a first cell and from a second network node, where the initial uplink message is a first uplink transmission scheduled to occur between the second network node and the first network node after a handover of the second network node from a second cell to the first cell, where the initial uplink message is different from a random access message and includes identity information that identifies the second network node. The operations of 1605 may be performed in accordance with examples as disclosed herein. In some examples, aspects of the operations of 1605 may be performed by an initial uplink message component 1235 as described with reference to FIG. 12.

At 1610, the method may include outputting, via the first cell, a response message that is associated with the second network node via the identity information. The operations of 1610 may be performed in accordance with examples as disclosed herein. In some examples, aspects of the operations of 1610 may be performed by a response component 1240 as described with reference to FIG. 12.

The following provides an overview of aspects of the present disclosure:

Aspect 1: A method of wireless communication performed by a first network node, comprising: receiving, via a first cell, information that indicates a resource allocation for transmission, via a second cell, of an initial uplink message, wherein the initial uplink message is a first uplink transmission scheduled to occur between the first network node and a second network node after a handover of the first network node from the first cell to the second cell; receiving, via the first cell, a command that triggers the handover of the first network node from the first cell to the second cell; and transmitting, via the second cell, the initial uplink message in response to the command and in accordance with the resource allocation.

Aspect 2: The method of aspect 1, wherein receiving the information comprises: receiving a cell switch command message that comprises both the information and the command.

Aspect 3: The method of aspect 2, wherein the initial uplink message is one of a PUSCH transmission, an SRS, a PUCCH transmission, or a PRACH transmission.

Aspect 4: The method of aspect 1, wherein receiving the information comprises: receiving, via the first cell, a control message that indicates one or more resource allocations for transmission of initial uplink messages after cell handovers, wherein the one or more resource allocations includes at least the resource allocation.

Aspect 5: The method of aspect 4, wherein receiving the command comprises: receiving a cell switch command message that comprises the command and an indication to activate the resource allocation for transmission of the initial uplink message after the handover.

Aspect 6: The method of any of aspects 4 through 5, wherein the resource allocation comprises a respective set of periodic or semi-persistent resources.

Aspect 7: The method of any of aspects 4 through 6, wherein the initial uplink message is one of a configured grant PUSCH transmission, an SR, a periodic or semi-persistent SRS, or a PRACH transmission.

Aspect 8: The method of aspect 4, wherein receiving the command comprises: receiving a cell switch command message that comprises the command, wherein reception of the cell switch command message activates the resource allocation for transmission of the initial uplink message.

Aspect 9: The method of aspect 8, wherein transmitting the initial uplink message comprises: transmitting the initial uplink message after a timing offset, wherein reception of the cell switch command message triggers the timing offset, and wherein a duration of the timing offset is preconfigured or is indicated in the cell switch command message.

Aspect 10: The method of any of aspects 1 through 9, wherein the first cell is associated with a first DU and the second cell is associated with the first DU or a second DU different from the first DU.

Aspect 11: The method of any of aspects 1 through 10, wherein the initial uplink message comprises identity information that identifies the first network node.

Aspect 12: The method of aspect 11, wherein transmitting the initial uplink message comprises: transmitting a PUSCH transmission as the initial uplink message, wherein the identity information is a C-RNTI included in the PUSCH transmission.

Aspect 13: The method of aspect 11, wherein transmitting the initial uplink message comprises: transmitting a PUSCH transmission as the initial uplink message, wherein the identity information is associated with a resource used for the PUSCH transmission.

Aspect 14: The method of aspect 11, wherein transmitting the initial uplink message comprises: transmitting a PUCCH transmission or an SRS as the initial uplink message, wherein the identity information is indicated by a sequence or scrambling identifier associated with the PUCCH transmission or the SRS.

Aspect 15: The method of aspect 11, wherein transmitting the initial uplink message comprises: transmitting a PRACH transmission as the initial uplink message, wherein the identity information is a dedicated preamble associated with the PRACH transmission.

Aspect 16: The method of any of aspects 1 through 15, further comprising: receiving, via the second cell, a response message responsive to the initial uplink message.

Aspect 17: The method of aspect 16, wherein the response message comprises a RAR message when the initial uplink message is a PRACH transmission.

Aspect 18: The method of aspect 16, wherein the response message comprises a PDCCH transmission that includes a CRC that is scrambled with an identifier of the first network node.

Aspect 19: The method of aspect 18, wherein the identifier is a C-RNTI associated with the second cell.

Aspect 20: The method of any of aspects 16 through 19, further comprising: receiving, via the first cell, an indication of a CORESET associated with the second cell; and monitoring the CORESET for the response message after transmission of the initial uplink message, wherein the CORESET is monitored in accordance with a TCI state associated with the second cell.

Aspect 21: The method of any of aspects 1 through 20, further comprising: determining, via the first cell, one or more parameters associated with the second cell, wherein transmission of the initial uplink message is in accordance with at least one parameter of the one or more parameters.

Aspect 22: The method of aspect 21, wherein determining the one or more parameters comprises: receiving a cell switch command message that comprises the command and an indication of the one or more parameters.

Aspect 23: The method of aspect 21, wherein determining the one or more parameters comprises: determining the one or more parameters via a rule or from one or more preconfigured values.

Aspect 24: The method of any of aspects 21 through 23, wherein the one or more parameters comprise one or more TCI states, one or more timing advance values, or one or more power control parameters.

Aspect 25: A method of wireless communication performed by a first network node, comprising: outputting, via a first cell, information that indicates a resource allocation for transmission, via a second cell, of an initial uplink message by a second network node, wherein the initial uplink message is a first uplink transmission scheduled to occur between the second network node and a third network node after a handover of the second network node from the first cell to the second cell; and outputting, via the first cell, a command that triggers the handover of the second network node from the first cell to the second cell.

Aspect 26: The method of aspect 25, wherein outputting the information comprises: outputting a cell switch command message that comprises both the information and the command.

Aspect 27: The method of aspect 26, wherein the initial uplink message is one of a PUSCH transmission, an SRS, a PUCCH transmission, or a PRACH transmission.

Aspect 28: The method of aspect 25, wherein outputting the information comprises: outputting, via the first cell, a control message that indicates one or more resource allocations for transmission of initial uplink messages after cell handovers, wherein the one or more resource allocations includes at least the resource allocation.

Aspect 29: The method of aspect 28, wherein outputting the command comprises: outputting a cell switch command message that comprises the command and an indication to activate the resource allocation for transmission of the initial uplink message after the handover.

Aspect 30: The method of any of aspects 28 through 29, wherein the resource allocation comprises a respective set of periodic or semi-persistent resources.

Aspect 31: The method of any of aspects 28 through 30, wherein the initial uplink message is one of a configured grant PUSCH transmission, an SR, a periodic or semi-persistent SRS, or a PRACH transmission.

Aspect 32: The method of aspect 25, wherein outputting the command comprises: outputting a cell switch command message that comprises the command, wherein reception of the cell switch command message activates the resource allocation for transmission of the initial uplink message.

Aspect 33: The method of any of aspects 25 through 32, wherein the first cell is associated with a first DU and the second cell is associated with the first DU or a second DU different from the first DU.

Aspect 34: The method of aspect 33, wherein the second cell is associated with the second DU, and the resource allocation is determined at the second DU.

Aspect 35: The method of any of aspects 25 through 34, further comprising: outputting a cell switch command message that comprises the command and an indication of one or more parameters associated with the second cell.

Aspect 36: The method of aspect 35, wherein the one or more parameters comprise one or more TCI states, one or more timing advance values, or one or more power control parameters.

Aspect 37: A method of wireless communication performed by a first network node, comprising: obtaining an initial uplink message via a first cell and from a second network node, wherein the initial uplink message is a first uplink transmission scheduled to occur between the second network node and the first network node after a handover of the second network node from a second cell to the first cell, wherein the initial uplink message is different from a random access message and comprises identity information that identifies the second network node; and outputting, via the first cell, a response message that is associated with the second network node via the identity information.

Aspect 38: The method of aspect 37, wherein obtaining the initial uplink message comprises: obtaining the initial uplink message after a timing offset.

Aspect 39: The method of any of aspects 37 through 38, wherein obtaining the initial uplink message comprises: obtaining a PUSCH transmission as the initial uplink message, wherein the identity information is a C-RNTI included in the PUSCH transmission.

Aspect 40: The method of any of aspects 37 through 38, wherein obtaining the initial uplink message comprises: obtaining a PUSCH transmission as the initial uplink message, wherein the identity information is associated with a resource used for the PUSCH transmission.

Aspect 41: The method of any of aspects 37 through 38, wherein obtaining the initial uplink message comprises: obtaining a PUCCH transmission or an SRS as the initial uplink message, wherein the identity information is indicated by a sequence or scrambling identifier associated with the PUCCH transmission or the SRS.

Aspect 42: The method of any of aspects 37 through 38, wherein obtaining the initial uplink message comprises: obtaining a PRACH transmission as the initial uplink message, wherein the identity information is a dedicated preamble associated with the PRACH transmission.

Aspect 43: The method of any of aspects 37 through 42, wherein the first cell is associated with a first DU and the second cell is associated with the first DU or a second DU different from the first DU.

Aspect 44: The method of aspect 43, wherein the second cell is associated with the second DU, and wherein obtaining the initial uplink message comprises: obtaining the initial uplink message in accordance with a resource allocation determined at the first DU.

Aspect 45: The method of aspect 44, wherein the resource allocation comprises a respective set of periodic or semi-persistent resources.

Aspect 46: The method of any of aspects 37 through 45, wherein the response message comprises a PDCCH transmission that includes a CRC that is scrambled with an identifier of the first network node.

Aspect 47: The method of aspect 46, wherein the identifier is a C-RNTI associated with the second cell.

Aspect 48: The method of any of aspects 37 through 47, wherein obtaining the initial uplink message comprises: obtaining the initial uplink message in accordance with one or more parameters associated with the second cell, wherein the one or more parameters are based at least in part the first cell.

Aspect 49: The method of aspect 48, wherein the one or more parameters comprise one or more TCI states, one or more timing advance values, or one or more power control parameters.

Aspect 50: The method of any of aspects 37 through 49, wherein the initial uplink message is one of a PUSCH transmission, an SRS, a PUCCH transmission, or an SR.

Aspect 51: A first network node for wireless communication, comprising a memory; and at least one processor coupled to the memory, wherein the at least one processor is configured to perform a method of any of aspects 1 through 24.

Aspect 52: An apparatus for wireless communication at a first network node, comprising at least one means for performing a method of any of aspects 1 through 24.

Aspect 53: A non-transitory computer-readable medium having code for wireless communication stored thereon that, when executed by a first network node, causes the first network node to perform a method of any of aspects 1 through 24.

Aspect 54: A first network node for wireless communication, comprising a memory; and at least one processor coupled to the memory, wherein the at least one processor is configured to perform a method of any of aspects 25 through 36.

Aspect 55: An apparatus for wireless communication at a first network node, comprising at least one means for performing a method of any of aspects 25 through 36.

Aspect 56: A non-transitory computer-readable medium having code for wireless communication stored thereon that, when executed by a first network node, causes the first network node to perform a method of any of aspects 25 through 36.

Aspect 57: A first network node for wireless communication, comprising a memory; and at least one processor coupled to the memory, wherein the at least one processor is configured to perform a method of any of aspects 37 through 50.

Aspect 58: An apparatus for wireless communication at a first network node, comprising at least one means for performing a method of any of aspects 37 through 50.

Aspect 59: A non-transitory computer-readable medium having code for wireless communication stored thereon that, when executed by a first network node, causes the first network node to perform a method of any of aspects 37 through 50.

The methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
   at least one memory; and
   at least one processor coupled to the at least one memory, wherein the at least one processor is configured to:
      receive, via a first cell, a radio resource control message that indicates a plurality of resource allocations for transmission, via a second cell, of a configured grant physical uplink shared channel message, wherein the configured grant physical uplink shared channel message is a first uplink data transmission to occur between the first network node and a second network node after a handover of the first network node from the first cell to the second cell;
      receive, via the first cell, a cell switch command that triggers the handover of the first network node from the first cell to the second cell and indicates one or more resource allocations from the plurality of resource allocations for transmission of configured grant physical uplink shared channel; and
      transmit, via the second cell, the configured grant physical uplink shared channel message in response to the cell switch command and in accordance with the one or more resource allocations.

2. The first network node of claim 1, wherein each resource allocation of the one or more resource allocations comprise a respective set of periodic or semi-persistent resources.

3. The first network node of claim 1, wherein reception of the cell switch command activates the one or more resource allocations for transmission of the configured grant physical uplink shared channel message.

4. The first network node of claim 3, wherein, to transmit the configured grant physical uplink shared channel initial uplink message, the at least one processor is configured to:
   transmit the configured grant physical uplink shared channel message after a timing offset, wherein reception of the cell switch command triggers the timing offset, and wherein a duration of the timing offset is preconfigured or is indicated in the cell switch command.

5. The first network node of claim 1, wherein the first cell is associated with a first distributed unit and the second cell is associated with the first distributed unit or a second distributed unit different from the first distributed unit.

6. The first network node of claim 1, wherein the configured grant physical uplink shared channel message comprises identity information that identifies the first network node.

7. The first network node of claim 6, wherein the identity information is a cell radio network temporary identifier included in the configured grant physical uplink shared channel message.

8. The first network node of claim 6, wherein the identity information is associated with a resource used for the configured grant physical uplink shared channel message.

9. The first network node of claim 1, wherein the at least one processor is further configured to:
   receive, via the second cell, a response message responsive to the configured grant physical uplink shared channel message.

10. The first network node of claim 9, wherein the response message comprises a physical downlink control channel transmission that includes a cyclic redundancy check that is scrambled with an identifier of the first network node.

11. The first network node of claim 10, wherein the identifier is a cell radio network temporary identifier associated with the second cell.

12. The first network node of claim 9, wherein the at least one processor is further configured to:
   receive, via the first cell, an indication of a control resource set associated with the second cell; and
   monitor the control resource set for the response message after transmission of the configured grant physical uplink shared channel message, wherein the control resource set is monitored in accordance with a transmission configuration indicator state associated with the second cell.

13. The first network node of claim 1, wherein the at least one processor is further configured to:
   determine, via the first cell, one or more parameters associated with the second cell, wherein transmission of the configured grant physical uplink shared channel message is in accordance with at least one parameter of the one or more parameters.

14. The first network node of claim 13, wherein the cell switch command comprises an indication of the one or more parameters.

15. The first network node of claim 13, wherein, to determine the one or more parameters, the at least one processor is further configured to:
determine the one or more parameters via a rule or from one or more preconfigured values.

16. The first network node of claim 13, wherein the one or more parameters comprise one or more transmission configuration indicator states, one or more timing advance values, or one or more power control parameters.

17. A first network node for wireless communication, comprising:
at least one memory; and
at least one processor coupled to the at least one memory, wherein the at least one processor is configured to:
output, via a first cell, a radio resource control message that indicates a plurality of resource allocations for transmission, via a second cell, of a configured grant physical uplink shared channel message by a second network node, wherein the configured grant physical uplink shared channel message is a first uplink data transmission to occur between the second network node and a third network node after a handover of the second network node from the first cell to the second cell; and
output, via the first cell, a cell switch command that triggers the handover of the second network node from the first cell to the second cell and indicates one or more resource allocations from the plurality of resource allocations for transmission of configured grant physical uplink shared channel.

18. A first network node for wireless communication, comprising:
at least one memory; and
at least one processor coupled to the at least one memory, wherein the at least one processor is configured to:
obtain a configured grant physical uplink shared channel message via a first cell and from a second network node, wherein the configured grant physical uplink shared channel message is a first uplink data transmission scheduled to occur between the second network node and the first network node after a handover of the second network node from a second cell to the first cell, wherein the configured grant physical uplink shared channel message is different from a random access message and comprises identity information that identifies the second network node; and
output, via the first cell, a response message that is associated with the second network node via the identity information.

19. The first network node of claim 18, wherein the first cell is associated with a first distributed unit and the second cell is associated with the first distributed unit or a second distributed unit different from the first distributed unit.

20. The first network node of claim 19, wherein the second cell is associated with the second distributed unit, and wherein, to obtain the configured grant physical uplink shared channel message, the at least one processor is further configured to:

obtain the configured grant physical uplink shared channel message in accordance with a resource allocation determined at the first distributed unit.

21. A method of wireless communication performed by a first network node, comprising:
receiving, via a first cell, a radio resource control message that indicates a plurality of resource allocations for transmission, via a second cell, of a configured grant physical uplink shared channel message, wherein the configured grant physical uplink shared channel message is a first uplink data transmission to occur between the first network node and a second network node after a handover of the first network node from the first cell to the second cell;
receiving, via the first cell, a cell switch command that triggers the handover of the first network node from the first cell to the second cell and indicates one or more resource allocations from the plurality of resource allocations for transmission of configured grant physical uplink shared channel; and
transmitting, via the second cell, the configured grant physical uplink shared channel message in response to the cell switch command and in accordance with the one or more resource allocations.

22. The method of claim 21, wherein each resource allocation of the one or more resource allocations comprise a respective set of periodic or semi-persistent resources.

23. The method of claim 22, wherein reception of the cell switch command activates the one or more resource allocations for transmission of the configured grant physical uplink shared channel message.

24. The method of claim 23, wherein transmitting the configured grant physical uplink shared channel message comprises:
transmitting the configured grant physical uplink shared channel message after a timing offset, wherein reception of the cell switch command triggers the timing offset, and wherein a duration of the timing offset is preconfigured or is indicated in the cell switch command.

25. The method of claim 21, wherein the first cell is associated with a first distributed unit and the second cell is associated with the first distributed unit or a second distributed unit different from the first distributed unit.

26. The method of claim 21, wherein the configured grant physical uplink shared channel message comprises identity information that identifies the first network node.

27. The method of claim 26, wherein the identity information is a cell radio network temporary identifier included in the configured grant physical uplink shared channel message.

28. The method of claim 26, wherein the identity information is associated with a resource used for the configured grant physical uplink shared channel message.

29. The method of claim 21, further comprising:
receiving, via the second cell, a response message responsive to the configured grant physical uplink shared channel message.

30. The method of claim 29, wherein the response message comprises a physical downlink control channel transmission that includes a cyclic redundancy check that is scrambled with an identifier of the first network node.

* * * * *